(12) United States Patent
Luo et al.

(10) Patent No.: US 10,449,488 B2
(45) Date of Patent: Oct. 22, 2019

(54) METHOD FOR CONTROLLING AEROSOL PRODUCTION DURING ABSORPTION IN AMMONIA DESULFURIZATION

(71) Applicant: Jiangnan Environmental Protection Group Inc., Grand Cayman (KY)

(72) Inventors: Jing Luo, Nanjing (CN); Lifang Qi, Beijing (CN); Jinyong Wang, Nanjing (CN)

(73) Assignee: Jiangnan Environmental Protection Group Inc., Grand Cayman OT (KY)

( * ) Notice: Subject to any disclaimer, the term of this patent is extended or adjusted under 35 U.S.C. 154(b) by 0 days.

(21) Appl. No.: 16/369,146

(22) Filed: Mar. 29, 2019

(65) Prior Publication Data
US 2019/0270048 A1 Sep. 5, 2019

Related U.S. Application Data

(63) Continuation of application No. 16/232,320, filed on Dec. 26, 2018, which is a continuation of application
(Continued)

(30) Foreign Application Priority Data

Sep. 7, 2017 (CN) .......................... 2017 1 0800599

(51) Int. Cl.
*B01D 53/50* (2006.01)
*B01D 53/75* (2006.01)
(Continued)

(52) U.S. Cl.
CPC ......... *B01D 53/505* (2013.01); *B01D 53/501* (2013.01); *B01D 53/502* (2013.01);
(Continued)

(58) Field of Classification Search
CPC ............. B01D 53/1481; B01D 53/502; B01D 53/507; B01D 53/76; B01D 53/78;
(Continued)

(56) References Cited

U.S. PATENT DOCUMENTS 2,810,627 A   10/1957 Johnstone et al.
3,645,671 A    2/1972 Griffin et al.
(Continued)

FOREIGN PATENT DOCUMENTS

CA    2971655    8/2017
CA    2971657    8/2017
(Continued)

OTHER PUBLICATIONS

Office Action issued by the Japanese Intellectual Property Office in Japanese Application No. 2017-123088, dated Apr. 16, 2018.
(Continued)

*Primary Examiner* — Timothy C Vanoy
(74) *Attorney, Agent, or Firm* — Weiss & Arons LLP

(57) ABSTRACT

Apparatus and methods for controlling aerosol production during absorption in ammonia desulfurization, by removing sulfur dioxide in flue gas with an absorption circulation liquid containing ammonium sulfite, so as to control the aerosol production during absorption in ammonia desulfurization. Efficient desulfurization and dust removal may be achieved by staged solution composition control and reaction condition control. At the same time ammonia escape and aerosol production during absorption may be controlled. The flue gas may be subjected to preliminary temperature lowering and purification, and may be allowed to contact with an absorption circulation liquid and a fine particle washing circulation liquid sequentially. Levels of solution compositions and reaction temperatures may be controlled.

30 Claims, 3 Drawing Sheets

Related U.S. Application Data

No. 16/130,245, filed on Sep. 13, 2018, which is a continuation of application No. 15/923,031, filed on Mar. 16, 2018, now Pat. No. 10,112,145.

(51) Int. Cl.
  *B01D 53/78* (2006.01)
  *B01D 53/96* (2006.01)

(52) U.S. Cl.
  CPC .......... *B01D 53/504* (2013.01); *B01D 53/75* (2013.01); *B01D 53/78* (2013.01); *B01D 53/96* (2013.01); *B01D 2251/206* (2013.01); *B01D 2252/102* (2013.01); *B01D 2257/302* (2013.01); *B01D 2258/0283* (2013.01)

(58) Field of Classification Search
  CPC .......... B01D 2247/00; B01D 2247/10; B01D 2247/103; B01D 2252/102; B01D 2252/608; B01D 2257/302; B01D 2258/0283; B01D 2259/10
  See application file for complete search history.

(56) References Cited

U.S. PATENT DOCUMENTS

| | | |
|---|---|---|
| 3,752,877 A | 8/1973 | Beavon |
| 3,983,217 A | 9/1976 | Muraki et al. |
| 4,248,842 A | 2/1981 | Kaupisch et al. |
| 4,250,160 A | 2/1981 | Eakman |
| 4,294,590 A | 10/1981 | Linde et al. |
| 4,324,776 A | 4/1982 | Kim |
| 4,378,977 A | 4/1983 | Linde et al. |
| 4,552,747 A | 11/1985 | Goar |
| 4,690,807 A | 9/1987 | Saleem |
| 5,019,361 A | 5/1991 | Hakka |
| 5,106,607 A | 4/1992 | Chopin et al. |
| 5,362,458 A | 11/1994 | Saleem et al. |
| 5,632,967 A | 5/1997 | Nasato |
| 6,063,352 A | 5/2000 | Risse et al. |
| 6,066,304 A | 5/2000 | Freetly et al. |
| 6,139,807 A | 10/2000 | Risse et al. |
| 6,221,325 B1 | 4/2001 | Brown et al. |
| 6,444,185 B1 | 9/2002 | Nougayrede et al. |
| 6,508,998 B1 | 1/2003 | Nasato |
| 6,569,398 B2 | 5/2003 | Fenderson |
| 6,616,908 B2 | 9/2003 | Watson et al. |
| 6,776,974 B1 | 8/2004 | Burmaster et al. |
| 6,991,771 B2 | 1/2006 | Duncan et al. |
| 7,351,392 B2 | 4/2008 | Chen et al. |
| 7,635,408 B2 | 12/2009 | Mak et al. |
| 7,648,692 B2 | 1/2010 | Chow et al. |
| 7,754,471 B2 | 7/2010 | Chen et al. |
| 7,879,135 B2 | 2/2011 | Ravikumar et al. |
| 7,910,077 B2 | 3/2011 | Chow et al. |
| 8,178,070 B2 | 5/2012 | Wong et al. |
| 8,206,669 B2 | 6/2012 | Schaffer et al. |
| 8,361,432 B2 | 1/2013 | Parekh et al. |
| 8,444,943 B2 | 5/2013 | Lamar |
| 8,545,793 B2 | 10/2013 | Thielert |
| 8,871,176 B2 | 10/2014 | Liu et al. |
| 9,370,745 B2 | 6/2016 | Xu et al. |
| 2003/0175190 A1 | 9/2003 | Duncan et al. |
| 2005/0002852 A1 | 1/2005 | Karras et al. |
| 2007/0248518 A1 | 10/2007 | Jung et al. |
| 2009/0004070 A1 | 1/2009 | Chow et al. |
| 2011/0195008 A1 | 8/2011 | Menzel et al. |
| 2011/0243822 A1 | 10/2011 | Mortson |
| 2015/0352489 A1 | 12/2015 | Luo et al. |

FOREIGN PATENT DOCUMENTS

| | | | |
|---|---|---|---|
| CN | 1280032 A | 1/2001 | |
| CN | 201880482 U | 6/2001 | |
| CN | 1377722 A | 11/2002 | |
| CN | 1178735 C | 4/2003 | |
| CN | 1408464 A | 4/2003 | |
| CN | 1164480 C | 9/2004 | |
| CN | 2640584 Y | 9/2004 | |
| CN | 2640585 Y | 9/2004 | |
| CN | 2668235 Y | 1/2005 | |
| CN | 1617831 A | 5/2005 | |
| CN | 2746971 Y | 12/2005 | |
| CN | 2746972 Y | 12/2005 | |
| CN | 2746973 Y | 12/2005 | |
| CN | 2754711 Y | 2/2006 | |
| CN | 1251965 C | 4/2006 | |
| CN | 2772609 Y | 4/2006 | |
| CN | 2778373 Y | 5/2006 | |
| CN | 2799059 Y | 7/2006 | |
| CN | 2799060 Y | 7/2006 | |
| CN | 1283346 C | 11/2006 | |
| CN | 1321723 C | 6/2007 | |
| CN | 101085410 A | 12/2007 | |
| CN | 201030298 Y | 3/2008 | |
| CN | 201052456 Y | 4/2008 | |
| CN | 100395006 C | 6/2008 | |
| CN | 201109711 Y | 9/2008 | |
| CN | 100428979 C | 10/2008 | |
| CN | 201129965 Y | 10/2008 | |
| CN | 201132102 Y | 10/2008 | |
| CN | 101352642 A | 1/2009 | |
| CN | 201179415 Y | 1/2009 | |
| CN | 100460045 C | 2/2009 | |
| CN | 100475313 C | 4/2009 | |
| CN | 101422693 A | 5/2009 | |
| CN | 201231130 Y | 5/2009 | |
| CN | 101524620 A | 9/2009 | |
| CN | 201320447 Y | 10/2009 | |
| CN | 201333376 Y | 10/2009 | |
| CN | 101575103 A | 11/2009 | |
| CN | 101585511 A | 11/2009 | |
| CN | 201380037 Y | 1/2010 | |
| CN | 201380038 Y | 1/2010 | |
| CN | 201380039 Y | 1/2010 | |
| CN | 201380040 Y | 1/2010 | |
| CN | 100588608 C | 2/2010 | |
| CN | 101642629 A | 2/2010 | |
| CN | 201423237 Y | 3/2010 | |
| CN | 101274750 B | 6/2010 | |
| CN | 101745303 A | 6/2010 | |
| CN | 201492952 U | 6/2010 | |
| CN | 201529487 U | 7/2010 | |
| CN | 201529488 U | 7/2010 | |
| CN | 201537456 U | 8/2010 | |
| CN | 101884872 A * | 11/2010 | ............ B01D 53/75 |
| CN | 101274196 B | 12/2010 | |
| CN | 101182926 B | 1/2011 | |
| CN | 101519192 B | 2/2011 | |
| CN | 101579600 B | 4/2011 | |
| CN | 102000490 A | 4/2011 | |
| CN | 102012034 A | 4/2011 | |
| CN | 101456541 B | 5/2011 | |
| CN | 101576261 B | 5/2011 | |
| CN | 101579602 B | 5/2011 | |
| CN | 102061206 A | 5/2011 | |
| CN | 101274204 B | 6/2011 | |
| CN | 101670231 B | 8/2011 | |
| CN | 201912884 U | 8/2011 | |
| CN | 201912885 U | 8/2011 | |
| CN | 201944861 U | 8/2011 | |
| CN | 201949808 U | 8/2011 | |
| CN | 102205202 A | 10/2011 | |
| CN | 102380305 A | 3/2012 | |
| CN | 102381685 A | 3/2012 | |
| CN | 102381686 A | 3/2012 | |
| CN | 102423597 A | 4/2012 | |
| CN | 101791517 B | 5/2012 | |
| CN | 102451604 A | 5/2012 | |
| CN | 101456540 B | 7/2012 | |
| CN | 101574614 B | 7/2012 | |
| CN | 101637685 B | 7/2012 | |
| CN | 102631827 A | 8/2012 | |

(56) References Cited

FOREIGN PATENT DOCUMENTS

| | | | |
|---|---|---|---|
| CN | 202460375 U | 10/2012 | |
| CN | 202460420 U | 10/2012 | |
| CN | 202460438 U | 10/2012 | |
| CN | 101530727 B | 11/2012 | |
| CN | 101955828 B | 11/2012 | |
| CN | 102211762 B | 11/2012 | |
| CN | 101972592 B | 12/2012 | |
| CN | 202538627 U | 12/2012 | |
| CN | 101934191 B | 1/2013 | |
| CN | 102049186 B | 1/2013 | |
| CN | 102872709 A | 1/2013 | |
| CN | 202725003 U | 2/2013 | |
| CN | 202751942 U | 2/2013 | |
| CN | 202754802 U | 2/2013 | |
| CN | 202829575 U | 3/2013 | |
| CN | 101418246 B | 4/2013 | |
| CN | 202912691 U | 5/2013 | |
| CN | 202924730 U | 5/2013 | |
| CN | 202953829 U | 5/2013 | |
| CN | 102381687 B | 8/2013 | |
| CN | 103263841 A | 8/2013 | |
| CN | 203159221 U | 8/2013 | |
| CN | 203264545 U | 11/2013 | |
| CN | 203291675 U | 11/2013 | |
| CN | 102489140 B | 12/2013 | |
| CN | 103418223 A | 12/2013 | |
| CN | 203329558 U | 12/2013 | |
| CN | 203612955 U | 5/2014 | |
| CN | 102942162 B | 8/2014 | |
| CN | 203781842 U | 8/2014 | |
| CN | 102910593 B | 9/2014 | |
| CN | 102847431 B | 10/2014 | |
| CN | 103204477 B | 10/2014 | |
| CN | 103446859 B | 10/2014 | |
| CN | 104138713 A | 11/2014 | |
| CN | 103301732 B | 1/2015 | |
| CN | 103041679 B | 2/2015 | |
| CN | 103301736 B | 2/2015 | |
| CN | 104368231 A | 2/2015 | |
| CN | 204134465 U | 2/2015 | |
| CN | 204151066 U | 2/2015 | |
| CN | 102895870 B | 3/2015 | |
| CN | 102923670 B | 3/2015 | |
| CN | 204198421 U | 3/2015 | |
| CN | 103223292 B | 4/2015 | |
| CN | 104555939 A | 4/2015 | |
| CN | 204233957 U | 4/2015 | |
| CN | 103112831 B | 5/2015 | |
| CN | 204352660 U | 5/2015 | |
| CN | 103301705 B | 8/2015 | |
| CN | 103482583 B | 9/2015 | |
| CN | 104923046 A | 9/2015 | |
| CN | 104927894 A | 9/2015 | |
| CN | 104941423 A | 9/2015 | |
| CN | 104946296 A | 9/2015 | |
| CN | 103463949 B | 12/2015 | |
| CN | 105110819 A | 12/2015 | |
| CN | 105126573 A | 12/2015 | |
| CN | 105148712 | 12/2015 | |
| CN | 105195002 A * | 12/2015 | ............ B01D 53/78 |
| CN | 104353258 B | 1/2016 | |
| CN | 104249995 B | 4/2016 | |
| CN | 205235588 U | 5/2016 | |
| CN | 205245200 U | 5/2016 | |
| CN | 205252720 U | 5/2016 | |
| CN | 205252721 U | 5/2016 | |
| CN | 205252722 U | 5/2016 | |
| CN | 205262780 U | 5/2016 | |
| CN | 103822217 B | 6/2016 | |
| CN | 105642098 A | 6/2016 | |
| CN | 105757688 A | 7/2016 | |
| CN | 104555940 B | 8/2016 | |
| CN | 105841168 A | 8/2016 | |
| CN | 104524948 B | 9/2016 | |
| CN | 205549846 U | 9/2016 | |
| CN | 205562498 U | 9/2016 | |
| CN | 103521060 B | 1/2017 | |
| CN | 103939918 B | 1/2017 | |
| CN | 104208992 B | 2/2017 | |
| CN | 104258713 B | 2/2017 | |
| CN | 104528659 B | 4/2017 | |
| CN | 109045981 A * | 12/2018 | ............ B01D 53/78 |
| DE | 3733319 A1 | 9/1989 | |
| EP | 165609 B1 | 6/1985 | |
| EP | 212523 A2 | 3/1987 | |
| JP | S47-043737 | 11/1972 | |
| JP | 08299755 A | 11/1996 | |
| TW | 497985 | 8/2002 | |
| WO | WO02062453 A1 | 8/2002 | |
| WO | WO200507505 A1 | 8/2005 | |
| WO | WO2005113429 A1 | 12/2005 | |
| WO | WO2006113935 A2 | 10/2006 | |
| WO | WO2012152919 A1 | 11/2012 | |

OTHER PUBLICATIONS

"Introduction to FGD for China Shenhua Coal to Liquid(CTL) Project," Jiangnan Environmental Technology, Inc., 19th Annual Electric Power Conference and Exhibition, Apr. 13, 2017, Chicago, Illinois.

"Advantages & Application of Efficent Ammonia-Based Desulfurization Technology," Jiangnan Environmental Technology, Inc., 19th Annual Electric Power Conference and Exhibition, Apr. 13, 2017, Chicago, Illinois.

European Intellectual Property Office Search Report, dated Oct. 11, 2018.

Wende Xiao and Zhiquan Wu, "Sulfur Dioxide Removal and Recovery," Chemical Industry Press (China), 143-145, May 2001.

Yang Yang, "Sulfur Dioxide Emission Reduction Technology and Flue Gas Desulfurization Project," Metallurgical Industry Press (China), 184-187, Jan. 2004.

Ke Zhang, "Industrial Chemistry," Commercial Press (China), 83-85, Jan. 1958.

Xianxi Ku, "Chemical Technology," Metallurgical Industry Press (China), 37-42, May 1995.

Zhuo Nan and Zengtai Zhao, "Nitrogen Fertilizer Industry," China Industry Press (China) 20-21, Mar. 1964.

Tianqi Liu and Xiaolin Huang, "Three Waste Treatment Engineering Technical Manual (part of Exhaust Gas)," Chemical Industry Press (China), 207-208, May 1999.

Shengli Cao, "Coal Chemical Product Technology," Metallurgical Industry Press (China), 43, Jun. 2003.

Google Patents English translation of CN1283346C, 2006.
Google Patents English translation of CN2640585Y, 2004.
Google Patents English translation of CN2772609Y, 2006.
Google Patents English translation of CN100428979C, 2008.
Google Patents English translation of CN201912885U, 2011.
Google Patents English translation of CN10322392A.

Office Action issued in U.S. Appl. No. 14/829,905 dated Nov. 16, 2015.

Office Action issued in U.S. Appl. No. 14/829,905 dated Feb. 29, 2016.

Office Action issued in U.S. Appl. No. 14/829,909 dated Apr. 15, 2016.

Office Action issued in U.S. Appl. No. 14/829,909 dated Dec. 14, 2016.

Office Action issued in U.S. Appl. No. 14/829,909 dated Feb. 14, 2017.

International Search Report issued for International Application No. PCT/CN2013/074657, dated Dec. 26, 2013.

International Search Report issued for International Application No. PCT/CN2014/087887, dated Jan. 14, 2015.

Supplementary European Search Report issued in European Application No. 13882863.7, dated Mar. 11, 2016.

Canadian Intellectual Property Office Examination Report, dated Apr. 24, 2019.

Canadian Intellectual Property Office Examination Report, dated Sep. 11, 2018.

(56) References Cited

OTHER PUBLICATIONS

International Search Report, dated Sep. 7, 2018.
Written Opinion of the International Searching Authority, dated Oct. 18, 2018.
Philippine Intellectual Property Office Search Report, dated Nov. 5, 2018.

* cited by examiner

METHOD FOR CONTROLLING AEROSOL PRODUCTION DURING ABSORPTION IN AMMONIA DESULFURIZATION

This application is a continuation of U.S. application Ser. No. 16/232,320, filed on Dec. 26, 2018, which is a continuation of U.S. application Ser. No. 16/130,245, filed on Sep. 13, 2018, which is a continuation of U.S. application Ser. No. 15/923,031, filed on Mar. 16, 2018, now U.S. Pat. No. 10,112,145, issued Oct. 30, 2018, which claims priority under 35 U.S.C. § 119 of Chinese Patent Application No. 201710800599.0, filed on Sep. 7, 2017, all of which are hereby incorporated herein in their entireties.

TECHNICAL FIELD

The present disclosure relates to the field of the environmental technology, and particularly to a method for controlling aerosol production during absorption in ammonia desulfurization.

BACKGROUND

Various countries in the world discharge sulfur dioxide to different extents. Sulfur dioxide emissions are huge in China, have a huge impact on the environment and society, and the total sulfur dioxide emission in 2014 was 19.74 million tons, and, in 2015, 18.591 million tons, ranking first in the world, resulting in a huge economic loss and a serious impact on ecological environment and people's health in China.

Currently there are hundreds of relatively mature desulfurization technologies, in which the wet desulfurization process is the most widely used, accounting for around 85% of the world's total installed capacity for desulfurization. Common wet flue gas desulfurization technologies are limestone-gypsum, double alkalis, sodium carbonate, ammonia, magnesium oxide methods, and the like. Ammonia desulfurization is a wet desulfurization process using ammonia as an absorbent, and this method can produce an ammonium sulfate fertilizer using $SO_2$, and is a kind of green flue gas treatment scheme with low energy consumption, high added value and realized resource recycling. There is a large amount of ammonia wastewater generated during production in the chemical industry, and therefore using ammonia desulfurization for boiler exhaust gas in the chemical industry has its unique advantages.

Ammonia desulfurization process mainly includes three procedures, absorption, oxidation and concentration (crystallization), by:

Absorbing sulfur dioxide with ammonium sulfite to obtain a mixed solution of ammonium sulfite and ammonium bisulfite, to which ammonia is added to obtain ammonium sulfite:

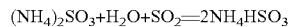

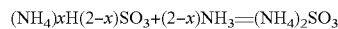

Supplying oxidation air to the solution to oxidize ammonium sulfite to give ammonium sulfate:

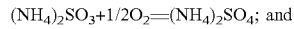

Subjecting the ammonium sulfate solution to concentration, crystallization, solid-liquid, separation and drying, thereby obtaining the final product ammonium sulfate.

The three procedures, absorption, oxidation and concentration, seem simple. In fact, they influence each other. Conventionally, in order to ensure the absorption efficiency, ammonium sulfite and free ammonia contents were maintained at a high level, and the ammonium sulfate content was maintained at a low level in the absorption liquid, which is conducive to absorption, but not conducive to oxidation and concentration, and pH of the absorption liquid was maintained at about 7, thereby leading to serious ammonia escape and aerosols during absorption.

In order to ensure the absorption efficiency, conventionally, the absorption temperature was controlled to be not higher than 40° C. by cooling with process water, setting a reheater, lowering temperature with a dilute ammonium sulfate solution, and other measures that are conducive to absorption, but not conducive to oxidation and concentration. At a low temperature, ammonium sulfite at a high concentration cannot be completely directly oxidized to ammonium sulfate quickly, but same at a lower concentration can be subjected to oxidation and the evaporation and concentration processes to obtain a product, with a large amount of evaporation, large energy consumption, a long flow process, a lot of equipment, a large footprint, a high operation cost, and poor economical efficiency of the device. Furthermore, generally the water content of the boiler flue gas is maintained at not less than 7%. The water content of sulfur recovery exhaust gas, incineration flue gas and other industrial exhaust gas is even more than 25%. Therefore if the absorption efficiency is deliberately pursued by reducing the absorption temperature to not less than 40 °C., not only is the energy consumption high, but also the water in the flue gas will condense. The condensed water is excess, is not conducive to rinsing the demister and rinsing the tower wall, and needs to be discharged in the form of waste water.

As for a dry method for the sulfuric acid exhaust gas, due to a low water content and a low concentration of sulfur dioxide, the absorption temperature can be controlled at 30° C.-50° C.

Ammonia desulfurization processes for flue gas may involve the following technical issues:

1. Ammonia Escape and Aerosols

Different from the limestone-gypsum method based on limestone as the raw material, the ammonia is easy to volatilize, when the free ammonia is present in the absorption liquid, ammonia, $SO_2$ and $SO_3$ are simultaneously present in the gas phase. Therefore, ammonium sulfite and ammonium sulfate mist is forms easily, and saturated water vapor in the flue gas condenses onto the mist by using the mist as a core, thereby forming dense white mist, which on the one hand causes ammonia loss, and on the other hand causes secondary pollution.

Until now the ammonia desulfurization failed to be effectively generalized, for which the main reason is that the previous efforts focus on how to capture aerosols produced during absorption, and not suppress or reduce aerosol production during absorption, resulting in a large system investment, high operation cost and unstable operation.

2. Oxidation of Ammonium Sulfite

The oxidation of ammonium sulfite is different from other sulfites, and NH4+ at a certain concentration has a damping effect on the oxidation process. Literature (for example, Zhou, J., W. Li, and W. Xiao, Kinetics Of Heterogeneous Oxidation Of Concentrated Ammonium Sulfite, Chemical Engineering Science, Volume 55, Issue 23, December 2000, Pages 5637-5641, Pergamon Press, Oxford, England, 2000, which is hereby incorporated herein by reference in its entirety) illustrates this unique property, i.e. $NH_4+$ significantly blocks the dissolution of $O_2$ in aqueous solutions. When the salt concentration is less than 0.5 mol/L (about 5%

(wt)), the oxidation rate of ammonium sulfite increases with the increase of its concentration; and when this limit is exceeded, the oxidation rate decreases with the increase of the concentration. In addition, when the concentration of the total ammonium salt is 3-4 mol/L, and the concentration of ammonium sulfite is less than 0.15 mol/L, the oxidation reaction of the solution is a $0^{th}$-order rapid reaction, i.e., the oxidation rate is irrelevant to the ammonium sulfite content.

The oxidation reaction of ammonium sulfite actually also occur during absorption, but due to a low $O_2$ content in the flue gas, a low temperature and a slow reaction speed, the oxidation rate is generally 40%-70% in continuous cycling conditions. However, further improving the oxidation rate to not less than 95% to meet the post-treatment processing requirements is still needed, so an oxidation tank/oxidation section jet oxidizer has been used in to fully oxidize ammonium sulfite in a condition of excess and pressurized oxidation air, and some manufacturers choose to add a catalyst to the absorption liquid to promote the oxidation, but this will affect the product quality.

3. Recovery of the Exhaust Gas Entraining Ammonia

Different from other alkaline substances, ammonia is easily volatile. In traditional counter-current contact type absorption towers, either spray towers, packed towers or plate towers, in order to ensure the desulfurization efficiency and the final emission index, the pH value of a solution is the highest, the concentration of $SO_2$ in the gas phase is the lowest and the concentration of ammonia in the gas phase will be the highest at a contact point at the top of the absorption zone. This means that the amount of ammonia spilling with the exhaust gas out of the desulfurization tower will be large. This will cause the waste and loss of ammonia, but also cause new pollution As for the aerosols and ammonia escape problems, well-known research institutions and engineering companies have proposed a variety of schemes to control or eliminate, such as wet electricity, multi-stage water washing, multi-stage demisting or a combination thereof; however, these methods treat the problem not from the sources producing aerosols, and ammonia escape during absorption, only focusing on how to eliminate ammonia escape and aerosols produced during absorption, making the section number of towers more and more and the system more complex, which not only has poor treatment effects, but also has a substantial increase in investment and operation costs.

The absorption, oxidation and concentration of the ammonia desulfurization device interact with each other, the absorption requires a high pH value of the solution and a high ammonium sulfite content, the oxidation requires a relatively low total ammonium salt concentration and a low ammonium sulfite content, and the concentration requires a high ammonium sulfate content. Controlling ammonia escape and aerosols requires a low pH value and a solution not containing free ammonia.

Since the requirements of the solution compositions for different processes are different, more reasonable technologies for controlling aerosol production are highly required to achieve synergistic control of the absorption, oxidation and concentration, meet the emission requirements while reduce investment, simplify the technological process, and reduce the operation difficulty.

A Chinese patent for invention with an application number of CN 02136906.2 discloses a method and device for removal and recovery of $SO_2$ in flue gas, in which the concentration of ammonium sulfite is controlled between 0.1%-5% (wt), for example, between 0.5% and 2.0%, to create favorable conditions for oxidation, reduce the energy consumption and investment of oxidation, and ensure a high desulfurization efficiency. The ratio of ammonia in the absorption liquid to sulfur is 1.3-1.8 (molar ratio), the ratio of the absorption gas to liquid is 2000-5000 (volume ratio). Hot flue gas heat is used for concentrating the ammonium sulfate solution, and when the hot flue gas temperature is reduced to 50° C.-55° C. the concentration of ammonium sulfate can be increased to 40%-50% (wt), which will be sent to an ammonium sulfate crystallizer and processed into a commercial ammonium sulfate fertilizer. The oxidation section is provided with a longitudinal partition, so that the unoxidized ammonium sulfite solution and oxidized ammonium sulfate solution are separated as far as possible, so as to prevent the occurrence of back-mixing. In this method: 1) the concentration of the absorption liquid is low, and the method is only suitable for low sulfur-containing flue gas; 2) the method does not concern about the control of ammonia escape and aerosol production during absorption, it is necessary to provide a reheater to eliminate white smoke; 3) the crystallization is influenced by the drying air volume and dust content, and the crystallization amount is small and not stable, and the like.

A Chinese patent for invention with an application number of CN 201310634675.7 discloses a desulfurization and denitrification system and a desulfurization and denitrification method therewith, wherein the absorption section includes an one-level circulation liquid spraying layer I, an one-level circulation liquid spraying layer II, a filler absorption layer and an one-level circulation liquid spraying layer III arranged from bottom to top sequentially, in which the one-level circulation liquid spraying layer I is a fixed ammonia absorption layer for efficiently absorbing $SO_2$, the fixed ammonia absorption layer is a separate ammonia absorption circulation system, the one-level-circulation liquid spraying layer II and the filler absorption layer are used for preventing ammonia escape and for absorbing $SO_2$, and the one-level circulation liquid spraying layer III is used for preventing ammonia escape. However, the solution compositions are not specified, and the effect of controlling the ammonia escape and aerosols is limited by adding ammonia in layers.

A Chinese patent for invention with an application number of CN 201510009642.2 discloses a method for achieving integrated desulfurization and dust removal with ultrasonic waves for achieving ultra-low emissions, in which the flue gas which has been subjected to temperature reduction and desulfurization is fully washed by providing an absorption liquid droplet washing system, the droplet in the absorption liquid in flue gas is captured and removed, followed by demisting; after demisting, the flue gas is washed by the droplet of the absorption liquid, followed by demisting; the above-mentioned preliminarily purified flue gas is subjected to agglutination and/or coagulation so that the particle size of fine particles is enlarged, and the enlarged fine particles are removed by agglutination and/or a layer demister; and use of multi-stage water washing and multi-stage demisting ensures the total dust being qualified with large investment and high operation cost, which cannot control ammonia escape and aerosol production from the aspect of mechanism.

A Chinese patent for invention with an application number of CN 201510680578.0 discloses an ammonia double circulation desulfurization, denitrification and dust removal system, including a washing absorption tower (1) and an oxidation circulation tank (9); the washing absorption tower (1) consists of an efficient water mist removal section (2), an enhanced ammonia mist removal section (3), an absorption liquid demisting section (4), a secondary absorption section (5), a primary absorption section (6) and a washing and lowering temperature (7) sequentially; when the flue gas enters into the primary absorption section (6), $SO_2$ is primarily removed by using an ammonium nitrate-containing ammonium sulfate solution with a density of 1.1 to 1.15 kg/L and a pH value of 6.5 to 7 as an absorption liquid; and when the flue gas enters into the secondary absorption section (5), $SO_2$ is secondarily removed by using an ammonium nitrate-containing ammonium sulfate solution with a density of 1.05 to 1.1 kg,./L and a pH value of 5.5 to 6 as an absorption liquid. The technological process is complex, with excess ammonia used during absorption, significant aerosol and ammonia escape, and final emission targets that are difficult guarantee by water washing and demisting.

A Chinese patent for invention with an application number of CN 201610390173.8 discloses an integrated desulfurization and dust removal device with a single tower having six gradient purification sections for achieving ultra-low emissions, including: an oxidation section, a concentration section, an absorption section, a purified water washing section, a demisting section, a partition and a wet electrical section; wherein the tiny droplets carried by demisted flue gas are further removed through the electrostatic adsorption action in the wet electrical section, so as to ensure that the discharge standard of flue gas is met when the working conditions for flue gas vary, and the section is used as an insurance measure for this device. The process requires large investment, has a high operation cost, and is an ineffective electrical method of controlling ammonia escape and aerosol emissions.

A Chinese patent for invention with an application number of CN 201610177178.2 discloses a combined desulfurization and dust removal process for achieving ultra-low emissions, a device therein includes a desulfurization tower (1); a flue gas inlet (2) and a flue gas outlet (9) are provided on the desulfurization tower (1); a washing and lowering temperature section (3), a primary absorption section (4), a secondary absorption section (5), a primary demisting section (6), a secondary demisting section (7), and a tertiary demisting section (8) are arranged in series in the flow direction of flue gas between the flue gas inlet (2) and the flue gas outlet (9); the flue gas containing $SO_2$ of fuel coal at 120° C.-180° C. is subjected to denitrification and dust removal, then enters into the washing and lowering temperature section (3) from the flue gas inlet (2), and is sprayed with an ammonium sulfate solution with a density of 1200-1250 g/L and a pH value of 3-5, so as to reduce the temperature of the flue gas to be 45° C.-60° C.; the flue gas flows into the primary absorption section (4), and is sprayed with an absorption liquid with a density of 1100-1250 g/L and a pH value of 5.5-6.5; and when the flue gas enters into the secondary absorption section (5), it is sprayed with an absorption liquid with a pH value of 5.0-5.8 and a density of 1030-1100 g/L, and then the flue gas enters into the primary demisting section (6), the secondary demisting section (7) and the tertiary demisting section (8) sequentially, and is discharged from the flue gas outlet (9). The hot flue gas is subjected to gradient elution by controlling the density, pH value and the like of the absorption liquid, then subjected to mist droplet removal using a unique demister and other devices, and sulfur, smoke dust and the like in the flue gas can be effectively removed thereby achieving ultra-low emissions. However, the process does not specify the solution compositions and absorption temperatures, and still cannot control the ammonia escape and aerosol production from the source.

A Chinese patent for invention with an application number of CN 201611014433.8 discloses a method for reducing aerosol production in ammonia desulfurization, of which the particular steps are: 1) driving the aqueous ammonia into an ammonia absorption tower, initiating a primary absorption and circulation pump for spray washing, so as to desulfurize most SO2 in the flue gas; 2) driving the aqueous ammonia into the ammonia absorption tower for spray washing, where the spray liquid is further reacted with SO2 flue gas to remove pollutants in the flue gas: 3) passing the flue gas which has been subjected to the secondary absorption through a water washing and spraying device to wash impurities such as aerosols entrained in the flue gas; and 4) lastly purifying the flue gas, which has been subjected to water washing, against impurities such as liquid foams and residual aerosols entrained in the flue gas during washing and spraying, and discharging the cleaned exhaust gas up to standard. In step 1, the pH value of the absorption solution is strictly controlled at 5.5-6.5, and the density is controlled at 1.15-1.25 g/ml. In step 2, the pH value of the absorption solution is strictly controlled at 5.0-6.0, and the density is controlled at 1.0-1.20 g/ml. The process does not specify the solution compositions and absorption temperatures, and still cannot completely control the ammonia escape and aerosol production from the source. Also, the flue gas which has been subjected to simple water washing and demisting cannot meet or cannot easily meet the ulna-low emission standard requirements or higher requirements in China.

A Chinese patent for invention with an application number of CN201611207184.4 discloses a process for saving water and controlling the aerosol phenomenon in ammonia desulfurization process, wherein the boiler flue gas enters into a desulfurization tower, the $SO_2$-containing flue gas which has entered into the desulfurization tower is sprayed with a spray liquid of ammonium sulfate/ammonium sulfite solution with a concentration of 5%-35%, followed by passing through a filler layer, contacting with the cooling water on the filler layer, and then contacting with a water washing and spraying layer, during which the cooling water at the bottom of the filler layer falls onto a water washing liquid accumulation pan and reversely flows to a cooling water tower, then enters into a water washing tank, and is driven to a water washing and spraying layer through a water washing water infusion pump for recycling the system has advantages such as a simple flow process, a good cooling effect and a low operation cost, the spray cooling water absorbs substances such as $(NH4)_2SO_4$ particles, $SO_2$, and $NH_3$ in the boiler flue gas, the saturated water vapor in the boiler flue gas condenses, using the $(NH_4)_2SO_4$ particles as the cores to form water droplets, so that the $(NH_4)_2SO_4$ particles in the boiler flue gas are captured, thereby inhibiting the aerosol formation, and making the particle concentration in the boiler flue gas discharged in the ammonia desulfurization process be less than 30 mg/m³. The process does not specify the solution compositions, pH values and absorption temperatures, still cannot completely control ammonia escape and aerosol production from the source, furthermore, the energy consumption of low-temperature washing is high, and the particle concentration in purified flue gas is less than 30 mg/m³, which cannot meet the latest emission standards.

A Chinese patent for invention with an application number of CN 201310340885.5 discloses a method for controlling aerosol emission in ammonia desulfurization and a dedicated absorption tower therefor, wherein the flue gas which has been subjected to spraying with atomized water and lowering temperature and has been cooled to 100° C. to 120° C. is allowed to flow into a desulfurization zone of a desulfurization absorption tower, the flue gas in the desulfurization zone from bottom to top is allowed to contact with a desulfurization liquid countercurrent ejected from top to bottom to absorb $SO_2$ in the flue gas, and fillers or sieve plates are provided within the desulfurization zone; the flue gas after been desulfurized enters into a filler washing zone, into which washing water in injected to remove coarse-grained aerosols produced in ammonia desulfurization; the flue gas after been subjected to desulfurization and coarse-grained aerosol removal enters into a water-vapor phase transition zone, steam is injected into the middle of the water-vapor phase transition zone so as to establish an oversaturate water vapor environment required for the water-vapor phase transition, so that unremoved fine-grained aerosol particulates condense and grow up and are removed by a wire mesh demister at a flue gas outlet of the water-vapor phase transition zone; and the purified flue gas is discharged via a chimney from the flue gas outlet at the top of the desulfurization absorption tower. The superficial gas velocity of the flue gas is 2.0-3.0 m/s and an operation liquid to air ratio is 2 to 8 $L/Nm^3$; and the desulfurization liquid has a pH value of 5.2-6.0 and a temperature of 45° C.-55° C.; the desulfurizing agent in the desulfurization liquid is ammonium sulfate or ammonium sulfite at a concentration of 10% wt to supersaturated, the washing water spraying liquid-gas ratio in the filler washing zone is 0.6-3.0 $L/Nm^3$, the temperature of the flue gas after been washed through the filler layer is reduced to 50° C.-55° C., and in an embodiment, at the absorption tower outlet, the minimal mass concentration of $PM_{10}$ as is 45 $mg/m^3$ and the minimal $SO_2$ concentration is 135 $mg/Nm^3$. The process still cannot completely control ammonia escape and aerosol production from the source, furthermore, the particles and $SO_2$ in the purified flue gas cannot meet the latest emission standards, and the energy consumption of vapor phase transition is high.

A Chinese patent for invention with an application number of CN 201610966033.0 discloses a device and method for removing aerosols in ammonia desulfurization, the device including a desulfurization tower (1), wherein the interior of the desulfurization tower (1) is provided with an absorption reaction zone (2), an oxidation water-washing zone (3) and a water washing and purifying zone (4) from bottom to top sequentially; an oxidation water-washing and spraying layer (22) is provided within the oxidation water-washing zone (3), and the concentration of ammonium sulfate dissolved in an oxidation water-washing circulation liquid is controlled at ≤3%; the temperature of water washing and purifying is ≤50° C.; and the strong oxidant includes hydrogen peroxide or hypochlorite. The process does not specify the solution compositions, pH values and absorption temperatures, and still cannot completely control the ammonia escape and aerosol production from the source, furthermore, the investment in oxidation water-washing is large, the operation cost is high, and there is a certain safety risk.

BRIEF DESCRIPTION OF THE DRAWINGS

The objects and advantages of the invention will be apparent upon consideration of the following detailed description, taken in conjunction with the accompanying drawings, in which like reference character refer to like parts throughout, and in which.

Figure 1:
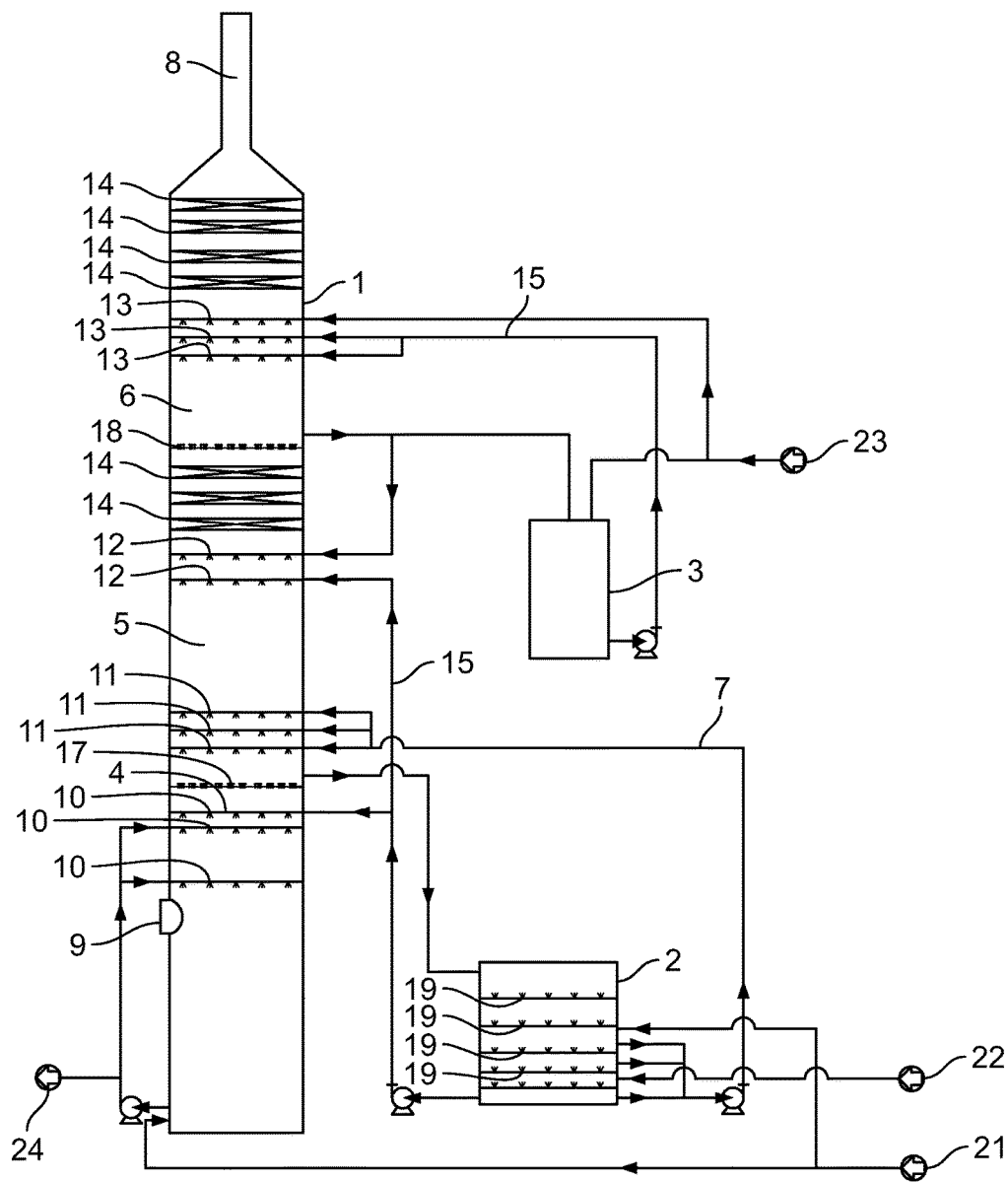
FIG. 1 is a schematic view of apparatus and methods in accordance with the principles of the invention.
Figure 2:
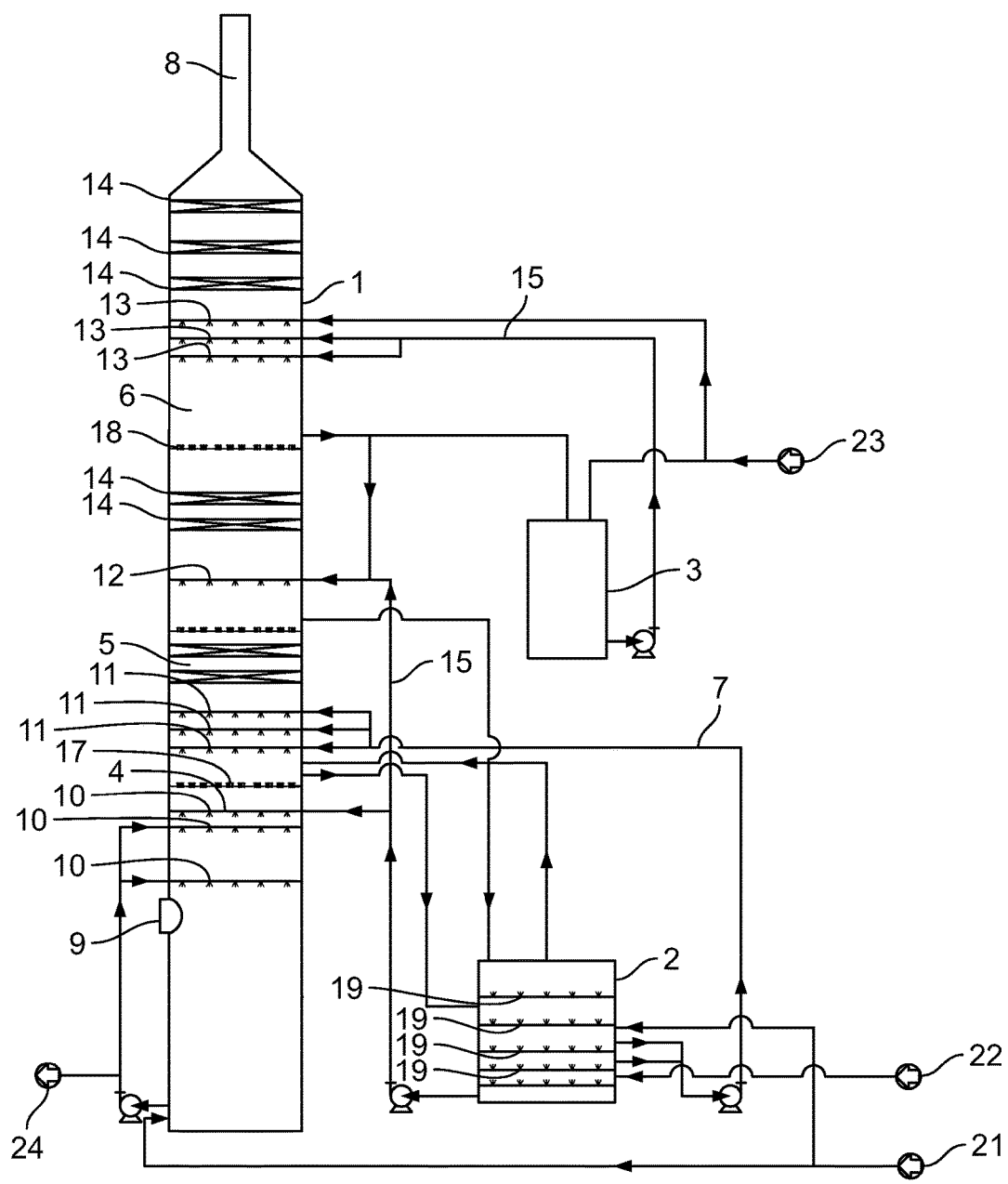
FIG. 2 is a schematic view of Example 1.
Figure 3:
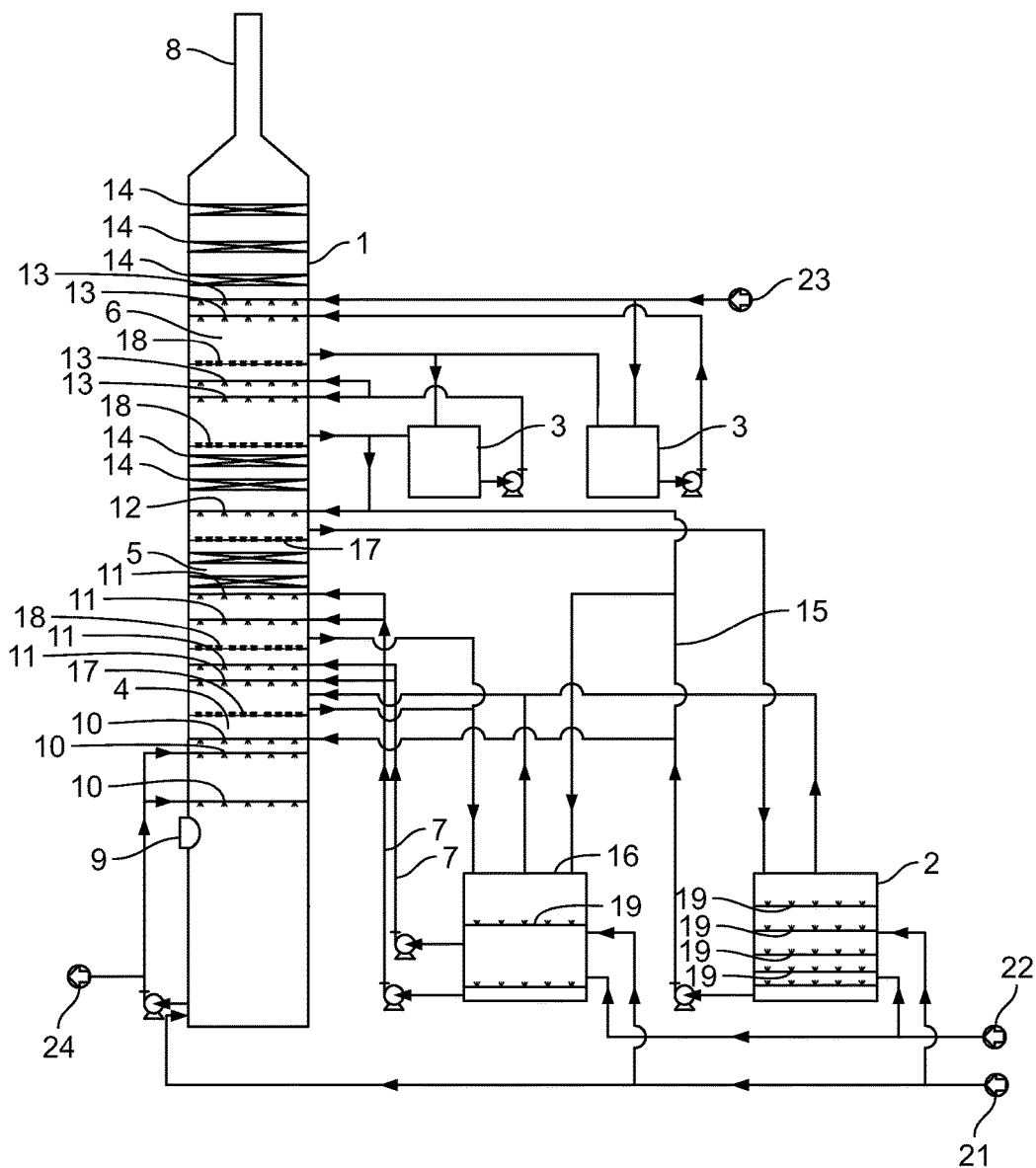
FIG. 3 is a schematic view of Example 2.

Reference Numerals:
1 absorption lower
2 oxidation vessel
3 fine particle washing circulation tank
4 pre-wash zone
5 absorption zone
6 fine particle control zone
7 absorption circulation liquid
8 purified flue gas outlet
9 flue gas inlet
10 pre-washing spraying layer
11 absorption spraying layer
12 fine particle spraying layer a
13 fine particle spraying layer b
14 demister
15 fine particle circulation washing liquid
16 absorption circulation tank
17 gas-liquid separator a
18 gas-liquid separator b
19 gas-liquid dispersion enhancer
21 ammonia
22 oxidation air
23 process water
24 ammonium sulfate post-processing system

DETAILED DESCRIPTION

Definitions

"Ammonia escape" means ammonia or one or more ammonia/amine bearing species that escape with the exhaust of the gas flow. The species are derived from ammonia or ammonia/amine bearing species that were added to the gas flow.

"Dust" means a particulate material fine enough to waft along gaseous flows, when handled, processed, or contacted. It includes but is not limited to aerosols, including solid aerosol-4-particles and liquid aerosol particles, soot, charcoal, non-combusted coal, fine minerals, sand, gravel, salts, and any combination thereof.

"Exhaust" means a flow of gas exiting an industrial or chemical process. It includes but is not limited to flue gas, tail gas, exhaust gases from ovens, furnaces, boilers, and or generators. It may comprise combustion products derived from the combustion of air and flammable material, residual material from chemical processes, which may include water, nitrogen, and pollutants, such as particulate matter, soot, carbon monoxide, nitrogen oxides, and sulfur oxides. The exhaust of one process may be a gaseous input to another process.

"Oxidation Rate" means the percentage, calculated by mol percent, of a given material that has been converted into an identified more-oxidized species of the material. For example, in a mixture containing ammonia bearing species and sulfur oxides, if X mol % of the mixture is ammonium sulfate, Y mol % is ammonium sulfite, and Z mol % is some other ammonia, sulfur, and/or oxygen containing species with an oxidation potential greater than ammonium sulfate, because ammonium sulfate is the identified most-oxidized species, the oxidation rate of the mixture would be X mol %.

"Recovery Rate of Ammonia" means that fraction or percentage of ammonia added to a gas cleaning process that is subsequently captured and extracted from the process.

"Spray Coverage" is a divergence of spray from a nozzle or an array of nozzles. The greater is the divergence, the greater is the spray coverage.

In the event that the above definitions or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Kirk-Othmer Encyclopedia of Chemical Technology, 5th Edition 2005, (John Wiley & Sons, Inc.) shall control, if provided therein.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g. 2.3 to 9.4, 3 to 8, 4 to 7) and finally to each number 1,2, 3, 4, 5, 6, 7, 8, 9, and 10 contained within the range. All percentages, ratios, and proportions herein are by weight unless otherwise specified. Unless explicitly stated otherwise, the term "molecular weight" means weight average molecular weight (mw).

Apparatus and methods for controlling aerosol production in ammonia desulfurization are provided. The apparatus may include, and the methods may involve, a gas purification and removal system. The gas purification and removal system may be configured to apply an ammonium salt gradient to flue gas. The apparatus may include, and the methods may involve, an oxidation system. The apparatus may include, and the methods may involve, an auxiliary system.

The oxidation system may include oxidation vessel that is configured to force oxidation of input ammonium solution to yield a plurality of outputs of different degrees of oxidation of the ammonium solution. The oxidation vessel may provide the outputs to the gas purification and removal system to define the gradient.

The auxiliary system may include an ammonium sulfate post-processing system. The auxiliary system may include an ammonia supply system. The auxiliary system may include a process water system.

The apparatus may include a tower. The tower may house the gas purification and removal system. The tower may include a pre-washing zone. The tower may include an absorption zone. The tower may include a fine particle control zone.

The apparatus may include a component disposed between the absorption zone and the pre-washing zone. The component may allow only gas to pass. The apparatus may include a plurality of spraying layers. The pre-washing zone may include a spraying layer of the plurality. The absorption zone may include a spraying layer of the plurality. The fine particle control zone may include a spraying layer of the plurality. The tower may be configured to provide divisional control of solution compositions to the spraying layers. Divisional control may include providing different compositions to different spraying layers. The different compositions may be selected or adjusted to select or adjust the gradient.

The oxidation system may include the spraying layers. The oxidation system may be configured to control interaction between (a) liquid sprayed at different ones of the spraying layers and (b) the flue gas at the respective different ones of the spraying layers to naturally oxidize the liquid to yield a plurality of outputs of different degrees of oxidation of the ammonium solution to define the gradient.

The oxidation system may be configured to control an operation temperature of one or more of the pre-washing zone, the absorption, and the fine particle control zone to control the gradient.

The oxidation system may be an oxidation system that does not include a forced oxidation vessel.

The oxidation system may be configured to route pre-washing liquid into the absorption zone.

Each zone may include a single spraying layer. Each zone may include a plurality of spraying layers.

The apparatus may include a component disposed between the absorption zone and the fine particle control zone. The component may allow only gas to pass.

The apparatus may include a component disposed within the absorption zone. The component may allow only gas to pass.

The apparatus may include a component disposed within the fine particle control zone. The component may allow only gas to pass.

The apparatus may include a plurality of demister layers. A demister layer of the plurality may be disposed in the fine particle control zone. A demister layer of the plurality may be disposed in each spraying layer of the pre-washing zone and the absorption zone.

A demister of the plurality of demister layers may include a baffle.

A demister of the plurality of demister layers may include a ridge.

A demister of the plurality of demister layers may include filler.

A demister of the plurality of demister layers may include a wire mesh.

A demister of the plurality of demister layers may include a combination of one or more of a baffle; a ridge; filler; and wire mesh.

Each spraying layer of the absorption zone may have a liquid-to-gas ratio that is not less than 0.2 L/Nm$^3$. Each spraying layer of the absorption zone may have a spray coverage that is not less than 110%.

Each spraying layer of the fine particle control zone may have a liquid-to-gas ratio that is not less than 0.1 L/Nm$^3$. Each spraying layer of the fine particle control zone may have a spray coverage that is not less than 105%.

Each spraying layer of the absorption zone may have a liquid-to-gas ratio that is not less than 02 L/Nm$^3$; and a spray coverage that is not less than 110%; and, each spraying layer of the fine particle control zone may have a liquid-to-gas ratio that is not less than 0.1 L/Nm$^3$; and a spray coverage that is not less than 105%.

The oxidation system may include a plurality of sections. Each section may correspond to an ammonium salt of a different composition. The oxidation system may be configured to provide to a fine particle washing circulation liquid and an absorption circulation liquid a composition of the plurality of the compositions to form the ammonium salt gradient.

A section may be defined by a layer of the oxidation system.

A section may be defined by a component of the oxidation system.

A section may be occupy a different position in the oxidation system.

The oxidation system may include 0, 1, 2, 3, 4, 5 or more layers of gas-liquid dispersion enhancers.

The oxidation system may include a liquid stage. The liquid stage may have a height that is greater than 3 m. The oxidation system may be configured to provide not less than 20% excess oxidation air.

The tower may be configured to cool and wash the flue gas using circulation washing liquid in the pre-washing zone, and simultaneously increase a concentration of the circulation washing liquid. The tower may be configured to pass the flue gas through the absorption zone, in which the flue gas is washed and desulfurized by absorption circulation liquid. The tower may be configured to pass the flue gas through the fine particle control zone, in which fine particles are removed by a fine particle circulation washing liquid. The tower may be configured to discharge the flue gas. The tower may be configured to replenish the circulation washing liquid in the pre-washing zone from the fine particle circulation washing liquid. The tower may be configured to rinse fouling on a tower wall. The tower may be configured to replenish the absorption circulation liquid. The tower may be configured to oxidize the absorption circulation liquid in the oxidation system. The tower may be configured to draw circulation liquids with different compositions from an oxidation system at different sections for distribution to the different zones.

The fine particle circulation washing liquid may be a majority constituent of circulation washing liquid replenishment fluids.

The tower may be configured to rinse fouling by spraying fine particle circulation washing liquid. The fouling may be a chemical fouling. The fouling may be a physical fouling. The fouling may be on the tower interior. The fouling may be on structures inside the tower.

The tower may be configured to rinse fouling by spraying process water.

The tower may be configured to replenish absorption circulation liquid with liquid from the fine particle control zone.

The tower may be configured to replenish absorption circulation liquid with process water. The tower may be configured to replenish the process water with liquid from the fine particle control zone.

The tower may be configured to provide a superficial flue gas velocity in the range 1-5 m/s.

The tower may be configured to provide in the pre-washing zone a temperature in the range 40° C. to 80° C.

The tower may be configured to receive flue gas having an $SO_2$ concentration as high as 30,000 mg/Nm$^2$.

The tower may be configured to exhaust purified flue gas that conforms to: all emission requirements of GB13223-2011, Emission Standard Of Air Pollutants For Thermal Power Plants, Ministry of Environmental Protection of The People's Republic of China, 2011, which is hereby incorporated by reference herein in its entirety. For example, GB13223-2011 requires that in China's key areas, dust, sulfur dioxide and nitrogen oxide emissions from coal-fired boilers be no higher than 20, 50 and 100 mg/Nm$^3$(6% oxygen content, dry basis), respectively. And, under Environment and Development No. 164(Full Implementation Of The Work Plan For Ultra-Low Emission And Energy Conservation Of Coal-Fired Power Plants, Ministry Of Environmental Protection, Development and Reform commission, Energy Bureau of The People's Republic of China, Released on Dec. 11, 2015, which is hereby incorporated by reference herein in its entirety), in China, by 2020, coal-fired power plants are to achieve ultra-low emissions (namely under the condition of 6% oxygen content, dust, sulfur dioxide, nitrogen oxide emission concentration shall be not more than 10, 35, 50 mg/m$^3$). Also, relative to ammonia-based desulfurization and electrostatic-demisting set forth in PCT/US2002/039095, which involves a method for removing $SO_2$/NO/$NO_2$ from gas flow as follows:

A. Oxidize some or all of the gas stream to $NO_2$; then,

B. Wash some or all $SO_2$, NO and $NO_2$ in the gas flow with washing liquid that contains ammonia, and has a pH between 6 and 8.

C. Use an aerosol removal device to remove some or all ammonia aerosol generated in the washing step; and D. Remove ammonium sulfate from the washing liquid as fertilizer, the tower may have a cost of construction that is 10-20% less; an operation cost that is 5-10% less; and a performance-price ratio that is 15-30% less.

The tower may be configured to discharge flue gas that has an $SO_2$ concentration not greater than 200 mg/Nm$^3$. The tower may be configured to discharge flue gas that has an $SO_2$ concentration not greater than 100 mg/Nm$^3$. The tower may be configured to discharge flue gas that has an $SO_2$ concentration not greater than 35 mg/Nm$^3$. The tower may be configured to discharge flue gas that has an $SO_2$ concentration not greater than 5 mg/Nm$^3$.

The tower may be configured to discharge flue gas that has a total dust concentration, including aerosols, not greater than 20 mg/Nm$^3$. The tower may be configured to discharge flue gas that has a total dust concentration, including aerosols, not greater than 10 mg/Nm$^3$. The tower may be configured to discharge flue gas that has a total dust concentration, including aerosols, not greater than 5 mg/Nm$^3$. The tower may be configured to discharge flue gas that has a total dust concentration, including aerosols not greater than 2 mg/Nm$^3$.

The tower may be configured to discharge flue gas that has an ammonia concentration not greater than 5 mg/Nm$^3$. The tower may be configured to discharge flue gas that has an ammonia concentration not greater than 2 mg/Nm$^3$. The tower may be configured to discharge flue gas that has an ammonia concentration not greater than 1 mg/Nm$^3$. The tower may be configured to discharge flue gas that has an ammonia concentration not greater than 0.5 mg/Nm$^3$.

The apparatus may include a drying device. The drying device may be configured to receive absorption liquid. The drying device may be configured to produce a solid product that includes an ion from a circulation liquid. The ion may include chloride. The ion may include fluoride.

The drying device may be configured to reduce the circulation liquid chloride ion IS concentration to less than 50,000 mg/L. The drying device may be configured to reduce the circulation liquid fluoride ion concentration to less than 20,000 mg/L. The drying device may be configured to reduce the circulation liquid fluoride ion concentration to 300-3000 mg/L. The drying device may be configured to reduce the circulation liquid chloride ion concentration to 10,000-31,000 mg/L.

The tower may be configured to spray, in a spraying layer in the absorption zone, absorption circulation liquid having a mass fraction ratio of ammonium sulfate to ammonium sulfite that is in the range 1.5-199 to 1.

The tower may be configured to spray, in a spraying layer in the fine particle absorption zone, fine particle circulation washing liquid having a mass fraction ratio of ammonium sulfate to ammonium sulfite that is in the range 3-1,999 to 1.

The methods may include applying an ammonium salt gradient to the flue gas. The methods may include applying a reaction condition gradient to the flue gas.

The applying an ammonium salt gradient may include applying a first ammonium salt concentration at a first stage. The applying an ammonium salt gradient may include applying a second ammonium salt concentration at a second stage. The first stage may be upstream, relative to the flue gas, from the second stage.

The salt may include ammonium sulfite. The salt may include ammonium bisulfite. The salt may include ammonium sulfate.

The first concentration may be greater than the second concentration.

The applying a first ammonium salt concentration at a first stage may include spraying on the flue gas absorption circulation liquid in a sulfur dioxide absorption process.

The applying a second ammonium salt concentration at a second stage may include spraying on the flue gas absorption circulation liquid in the sulfur dioxide absorption process.

The applying a first ammonium salt concentration at a first stage may include spraying on the flue gas fine particle washing circulation liquid in a fine particle washing process.

The applying a second ammonium salt concentration at a second stage may include spraying on the flue gas fine particle washing circulation liquid in the fine particle washing process.

The applying a reaction condition gradient may include providing a first temperature at a first stage. The applying a reaction condition gradient may include providing a second temperature at a second stage. The first stage may be upstream, relative to the flue gas, from the second stage.

The first temperature may be greater than the second temperature.

The providing a first temperature at a first stage may include setting a first temperature in a sulfur dioxide absorption process. The providing a second temperature at a second stage may include setting a second temperature in a fine particle washing process.

The applying a reaction condition gradient may include providing a first pH at a first stage. The applying a reaction condition gradient may include providing a second pH at a second stage. The first stage may be upstream, relative to the flue gas, from the second stage.

The first pH may be greater than the second pH.

The providing a first pH at a first stage may include spraying on the flue gas absorption circulation liquid in a sulfur dioxide absorption process.

The providing a second pH at a second stage may include spraying on the flue gas absorption circulation liquid in the sulfur dioxide absorption process.

The providing a first pH at a first stage may include spraying on the flue gas fine particle washing circulation liquid in a fine particle washing process.

The providing a second pH at a second stage may include spraying on the flue gas line particle washing circulation liquid in the fine particle washing process.

The method may include cooling and purifying the flue gas. The method may include after the cooling and purifying, absorbing sulfur dioxide. The method may include after the absorbing, removing the flue gas with a fine particle washing circulation liquid. The applying an ammonium salt gradient may be performed after the purifying and cooling. Both the absorbing and the removing may include spraying ammonium sulfite. Both the absorbing and the removing may include spraying ammonium sulfate.

The absorbing may include spraying on the flue gas absorption circulation liquid. The fine particle washing circulation liquid may have a pH that is lower than a pH of the flue gas absorption circulation liquid. The fine particle washing circulation liquid may have an ammonium sulfite concentration less than an ammonium sulfite concentration of the absorption circulation liquid.

The reaction condition may be a temperature gradient. The temperature gradient may be defined by an absorption temperature and a washing temperature. The applying a reaction condition gradient may include controlling the absorption temperature and the washing temperature to reduce an energy consumption. The applying a reaction condition gradient may include maintaining an absorption efficiency. The applying a reaction condition gradient may include maintaining a limit on ammonia escape. The applying a reaction condition gradient may include maintaining a limit on aerosol escape.

The absorption temperature may be in the range 30° C. to 70° C.

The absorption temperature may be in the range 35° C. to 60° C.

The absorption temperature may be the range 45° C. to 55° C.

The washing temperature may be in the range 28° C. to 68° C.

The washing temperature may be in the range in the range 30° C. to 55° C.

The washing temperature may be in the range in the range 40° C. to 50° C.

The absorbing may include spraying an absorption circulation liquid at a lower stage. The absorbing may include spraying an absorption circulation liquid at an upper stage that is downstream, relative to the flue gas, from the lower stage. The absorption circulation liquid at one or both of the lower and upper stages may include 0.15%-4.95% ammonium sulfite. The absorption circulation liquid at one or both of the lower and upper stages may include 5%-38% ammonium sulfate. The absorption circulation liquid at one or both of the lower and upper stages may have a pH value in the range 4-6.6. The ammonium sulfite concentration of the upper stage absorption circulation liquid may be lower than the ammonium sulfite concentration of the lower stage of the absorption circulation liquid.

The pH of the upper stage absorption circulation liquid may be lower than the pH of the lower stage of the absorption circulation liquid.

The absorbing may include spraying an absorption circulation liquid at a lower stage. The absorbing may include spraying an absorption circulation liquid at an upper stage that is downstream, relative to the flue gas, from the lower stage. The absorption circulation liquid at one or both of the lower and upper stages may include 0.15%-4.95% ammonium sulfite. The absorption circulation liquid at one or both of the lower and upper stages may include 5%-38% ammonium sulfate. The absorption circulation liquid at one or both of the lower and upper stages may have a pH value in the range 4-6.6. The pH of the upper stage absorption circulation liquid may be lower than the pH of the lower stage of the absorption circulation liquid.

The absorbing may include spraying absorption circulation liquid at a single stage.

The absorbing may include spraying absorption circulation liquid at only two stages.

At a stage of the removing, the fine particle washing circulation liquid may include 0.003%-1% ammonium sulfite. At a stage of the removing, the fine particle washing circulation liquid may include 0.3-38% ammonium sulfate. At a stage of the removing, the fine particle washing circulation liquid may have a pH in the range 3-5.4.

The removing may include spraying fine particle washing circulation liquid at two stages. At a stage of the stages the fine particle washing circulation liquid may include 0.1%-1% ammonium sulfite. At a stage of the stages the fine particle washing circulation liquid may include 5%-38% ammonium sulfate.

The apparatus and methods provide for controlling ammonia escape and aerosol production at the source, in which the sulfur dioxide in flue gas is removed with an absorption containing ammonium sulfite, and ammonia desulfurization is performed by converting ammonia. to ammonium sulfite by adding ammonia to an absorption circulation liquid. Furthermore, by using staged solution composition control and reaction condition control, synergistic control of absorption, oxidation, and concentration may be achieved. This may simplify the technological process, reducing the investment, and forming the technology of the present disclosure.

Illustrative principles of invention such as those below may be used alone or in combination, or in combination with other principles illustrated herein:

1. The gas purification process may include an absorption circulation and a fine particle washing circulation, and the circulation liquid during the gas purification may include an absorption circulation liquid and fine particle washing circulation liquid. The absorption circulation liquid may be mainly used for desulfurization and controlling the aerosol production during desulfurization. The fine particle washing circulation liquid may further aid desulfurization efficiency while the fine particle control is performed.

2. The reaction conditions may be controlled, the pH value of the absorption circulation liquid may be reduced to not more than 6.6, and the absorption temperature may be controlled at 30° C.-70° C., so that the ammonia escape and aerosols during, absorption is reduced, and the total dust at the outlet after demisting in the absorption zone is no greater than 100 mg/Nm3. This may reduce energy consumption, reduce or avoid waste water discharge, and provide long-period stable operation of the device.

3. The ammonium sulfite content of the absorption circulation liquid may be controlled. This may control aerosol production during absorption, create favorable conditions for oxidation, and reduce energy consumption and cost associated with oxidation.

4. The flue gas heat may be used, for concentration of the ammonium sulfate solution. Ammonium sulfate content of the absorption circulation liquid may be increased to not less than 5% generally, for example to not less than between 15% and 35%. This may maintain absorption efficiency and controlling aerosol production while aiding the concentration process. A process configured to accept raw flue gas having an SO2 concentration more than 10,000 mg/Nm3 only needs crystallization by saturation. For flue gas with a higher SO2 concentration, a part of the solution can be sent to an evaporation crystallization device for treatment, so as to reduce investment and energy consumption in an ammonium sulfate post-processing system.

5. The oxidation system, which may include different layers, different apparatus, or both, may be implemented according to the desired solution composition control. The fine particle washing circulation liquid and the absorption circulation liquid may be taken out from the oxidation vessel of the oxidation system at different positions, each corresponding to a different layer, or different apparatus.

The control of aerosol production during absorption may aid the disclosed processes. Control means may include precise divisional control of the solution composition. The absorption circulation liquid may be provided with 1 stage or multiple stages. One or more stages may include ammonium sulfite and ammonium sulfate, and the fine particle washing circulation liquid may be provided with one or more stages. One or more stages may include contains ammonium sulfite and ammonium sulfate. The fine particle washing circulation liquid may have a pH value that is lower than a pH value of the absorption circulation liquid and an ammonium sulfite content that is less than an ammonium sulfite content in the absorption circulation liquid. The absorption temperature may be controlled within a suitable range to reduce the energy consumption while ensuring the absorption efficiency and controlling ammonia escape and aerosols, and the total dust at the outlet after demisting in the absorption zone may be no greater than 100 mg/Nm$^3$.

The divisional solution composition may be controlled by forced oxidation via an oxidation vessel and/or natural oxidation and/or making the pre-washing liquid enter into the absorption zone and/or controlling the operation temperature.

The absorption temperature may be reduced through conventional means such as process water cooling and mixing with cold wind, and increased through conventional means such as mixing with hot wind.

A method for controlling aerosol production during absorption in ammonia desulfurization may include removing sulfur dioxide in flue gas with an absorption circulation liquid containing ammonium sulfite, so as to control the aerosol production during absorption in ammonia desulfurization.

The aerosol may include solid crystal grains precipitated by evaporating circulation absorption liquid droplets in hot flue gas, and solid particulates formed by reacting gaseous NH$_3$ escaped from the volatilization of aqueous ammonia in the circulation absorption liquid with SO$_2$ in the flue gas, which are mainly composed of $(NH_4)_2SO_3$, $NH_4HSO_3$, $NH_4HSO_4$, and $(NH_4)_2SO_4$. The higher the pH value of the circulation absorption liquid and/or the higher the operating temperature, the more severe the aerosol is.

Aerosol has a specific relationship with the total dust content at the outlet, the higher the aerosol content, the higher the total dust content at the outlet. Devices which cannot or do not control aerosols well may fail to meet the ultra-low emission requirements, for example, GB13223-2011, and the purified flue gas may form a "white dragon" when discharged into the atmosphere. This may extend a few kilometers or even tens of kilometers, causing serious haze pollution.

Efficient desulfurization and dust removal may be achieved by staged solution composition control and reaction condition control, and, concurrently, ammonia escape and aerosol production may be controlled.

The staged solution composition control may include concentration gradient control of ammonium sulfite, ammonium bisulfite, ammonium sulfate, or a combination thereof.

The flue gas subjected to preliminary temperature lowering and purification may be allowed to contact with an absorption circulation liquid and a fine particle washing circulation liquid sequentially so as to achieve synergistic control of absorption, oxidation and concentration. The absorption circulation liquid may be provided with 1 stage or multiple stages as required, wherein one or more stage may include ammonium sulfite and ammonium sulfate. The fine particle washing circulation liquid may be provided with 1 stage or multiple stages. One or more stage contains ammonium sulfite and ammonium sulfate.

The fine particle washing circulation liquid may have a pH value that is lower than a pH value of the absorption circulation liquid, and an ammonium sulfite content that is less than an ammonium sulfite content in the absorption circulation liquid.

An absorption temperature and a washing temperature may be controlled within a suitable range to reduce the energy consumption, while concurrently maintaining absorption efficiency and controlling ammonia escape and aerosols.

The absorption circulation liquid may have any suitable number of stages, for example, 1-2 stages, or 1 stage. When choosing multiple stages, one or more stage of composition of the absorption circulation liquid may include 0.15%-4.95% ammonium sulfite and 5%-38% ammonium sulfate, with a pH value of 4-6.6, and the ammonium sulfite content of an upper stage of the absorption circulation liquid may be lower than the ammonium sulfite content of a lower stage of the absorption circulation liquid. The pH value of an upper stage of the absorption circulation liquid may be lower than the pH value of a lower stage of the absorption circulation liquid.

One or more stage of composition of the fine particle washing circulation liquid may include 0.003%-1% ammonium sulfite and 0.3%-38% ammonium sulfate, with a pH value of 3-5.4.

The fine particle washing circulation liquid may have any suitable number of stages, for example, 2 stages. One of the stages may be a circulation liquid with a high concentration content of ammonium sulfate, in which ammonium sulfite is 0.1%-1% and ammonium sulfite content is 5%-38%; and the other stage may be a dilute solution, in which the ammonium sulfite content is not more than 0.1%. One stage of dilute solution may be included. One stage of process water may be included.

The absorption temperature may any suitable temperature, for example, from 30° C. to 70° C., from 35° C. to 60° C., or from 45° C. to 55° C.

The washing temperature may be any suitable temperature, for example, from 28° C. to 68° C., 30° C. to 55° C., or from 40° C. to 50° C.

The auxiliary system may include an ammonium sulfate post-processing system, an ammonia supply system, and a process water system.

The apparatus and methods may use divisional, and may include a pre-washing zone, an absorption zone, and a fine particle control zone, wherein each of the pre-washing zone, the absorption zone, and the fine particle control zone is provided with one or more layers of spraying layer, and a gas-liquid separator such as a liquid receiver, a partition with a gas cap, a gas distribution plate and a liquid receiving pan, which only allows gas to pass therethrough and allows the liquid to be taken out from the side or the lower part, is provided between the absorption zone and the pre-washing zone.

A gas-liquid separator that allows only gas to pass therethrough, and allows the liquid to be taken out from the side or the lower part, may be provided between the absorption zone and the fine particle control zone, within the absorption zone and within the fine particle control zone, as follows:

when the gas flow of original flue gas is more than 800,000 Nm$^3$/h, a gas-liquid separator which only allows gas to pass therethrough and allows the liquid to be taken out from the side or the lower part may be provided within the absorption zone and within the fine particle control zone;

when the concentration of SO$_2$ of original flue gas is more than 6,000 mg/Nm$^3$, a gas-liquid separator which only allows gas to pass therethrough and allows the liquid to be taken out from the side or the lower part may be provided within the absorption zone; and when the total dust of original flue gas is more than 100 mg/Nm$^3$, a gas-liquid separator which only allows gas to pass therethrough and allows the liquid to be taken out from the side or the lower part may be provided within the fine particle control zone.

The fine particle control zone may be provided with one or more layers of demisters, and each layer of the pre-washing zone and the absorption zone may be provided with one or more layers of demisters, The demisters may use baffles, ridges, fillers and wire mesh forms, or combination forms thereof.

The liquid-to-gas ratio and the spray coverage in each layer of the absorption zone may be controlled, so that sulfur dioxide, particles and free ammonia are fully or near fully absorbed. In particular, for example, the liquid-to-gas ratio may be not less than 0.2 L/Nm$^3$ and the spray coverage may be not less than 110% in each layer of the absorption zone; and the liquid-to-gas ratio may be not less than 0.1 L/Nm$^3$ and the spray coverage may be not less than 105% in each layer of the fine particle control zone.

The oxidation system may be established with layers or apparatus according to the requirements of the solution composition control. The fine particle washing circulation liquid and the absorption circulation liquid may be taken out from the oxidation vessel of the oxidation system at different positions or different apparatus.

In some embodiments, the absorption circulation liquid and the fine particle washing circulation liquid at a high concentration of ammonium sulfate and ammonium sulfite may be taken from the oxidation vessel of the oxidation system at different positions. The absorption circulation liquid may include 1-3 levels. The fine particle washing circulation liquid, at a high concentration of ammonium sulfate and ammonium sulfite, may include 1-2 stages. The fine particle washing circulation liquid, at a low concentration, may circulate separately from the fine particle washing circulation tank, and may be provided with 1-3 levels.

In some embodiments, the absorption circulation liquid may be taken from an absorption circulation tank, and may include 1-4 levels. The fine particle washing circulation liquid at a high concentration of ammonium sulfate and ammonium sulfite may be taken from the oxidation vessel of the oxidation system and may be of 1-2 stages. The fine particle washing circulation liquid at a low concentration of ammonium sulfate may be circulated separately from the fine particle washing circulation tank. The separate circulation may be omitted, for example, if the concentration of sulfur dioxide of the inlet flue gas is lower than 2,000 mg/Nm$^3$(dry basis, 6% O$_2$), and the emission concentration of sulfur dioxide of the clean gas is higher than 100 mg/Nm$^3$(dry basis, 6% O$_2$), and the fine particle washing circulation liquid may be sprayed at 1-3 levels.

In some embodiments, process water may be used as the last (most downstream) level of the fine particle washing circulation liquid.

1-5 layers of gas-liquid dispersion enhancers may be provided within the oxidation vessel of the oxidation system. The gas-liquid dispersion enhancer may use one or more of structured fillers, random fillers, perforated plates, gas caps, aeration heads, and the like, or any combination thereof.

The oxidation vessel may have a liquid level greater than 3 m and not less than 20% excess oxidation air.

The methods may include the following illustrative process:

the flue gas enters from the pre-washing zone and is cooled and washed by a circulation washing liquid in the pre-washing zone while the circulation washing liquid is concentrated, and then the flue gas passes through the absorption zone where the flue gas is washed and desulfurized by the absorption circulation liquid, passes through the fine particle control zone where fine particles are removed by a fine particle circulation washing liquid respectively, and then is discharged;

the circulation washing liquid in the pre-washing zone is mainly replenished by the fine particle circulation washing liquid, and the fine particle circulation washing liquid and/or process water is used to rinse fouling on a tower wall, and the absorption circulation liquid is replenished by the circulation washing liquid in the fine particle control zone and/or process water; and the absorption circulation liquid is oxidized in the oxidation system, and solutions with different compositions are drawn from the oxidation vessel of the oxidation system at different positions or different apparatus respectively for circulation.

The process water may be replenished from one or both of the fine particle control zone and the fine particle washing circulation tank, or it may be replenished by rinsing water.

The solution composition may be controlled by forced oxidation via an oxidation vessel and/or natural oxidation and/or making the pre-washing liquid enter into the absorption zone and/or controlling the operation temperature. Under normal circumstances, the temperature of the flue gas is 110° C.-180° C., oxygen content in the flue gas is 3%-7%, and the water content is 7-10%, at this time it is needed to control forced oxidation of part of the circulation liquid to control the solution composition within a desired range; however, in the case that the temperature of the flue gas is above 200° C. and/or the oxygen content in the flue gas is above 8%, the natural oxidation of the absorption circulation liquid by the flue gas can meet the requirements, and at this time it is not needed to control forced oxidation during circulation and absorption.

If the gas velocity of the absorption tower is high, the entrainment of liquid by gas is serious, or the sealing of trays from one zone to another zone is poor, so that the pre-washing circulation liquid and the absorption circulation liquid flow into each other, and it is also possible to obtain an ideal solution composition.

Implementations may include staged solution composition control and reaction condition control, so as to achieve efficient desulfurization and dust removal, and at the same time of the efficient desulfurization, ammonia escape and aerosol production during absorption are controlled. Desulfurization material may include ammonium sulfite. The absorption circulation liquid may be a weakly acidic ammonium sulfate-ammonium sulfite mixed solution, and the fine particle washing circulation liquid may be a more acidic ammonium sulfate-ammonium sulfite mixed solution at lower concentrations. This may aid in achieving synergistic control of absorption, oxidation and concentration.

The sulfur dioxide in the flue gas may be removed by the absorption circulation liquid containing ammonium sulfite, and the absorption circulation liquid after absorbing $SO_2$ may be converted into ammonium sulfite by adding ammonia and then subjected to ammonia desulfurization.

The absorption tower may have a flue gas inlet, and the various zones, positioned based flue gas parameters at on one or more of the following stages: inlet, after prewash control (if there is such a stage), after absorption, after fine particle control, after discharge. The positioning may also depend on whether or not there is a prewash control zone, the number of spray layers in the zones, the degree of absorption liquid oxidation in the oxidation system, and the degree of enrichment to post-processing. The flue gas inlet position may be at 10%-40% of the tower height, the height of the pre-washing zone may, be 10%-40% of the tower height, the height of the absorption zone may be 10%-35% of the tower height, and the height of the fine particle control zone may be 15%-70% of the tower height.

The ratio of the diameter of the absorption tower to the diameter of the oxidation vessel may be 0.5-3, and the height of the oxidation vessel may be 0.3-6 times the diameter of the absorption tower.

The superficial gas velocity of the absorption tower may be 1 m/s-5 m/s. The operation temperature of the pre-washing zone may be 40° C.-80° C.

The absorption temperature may be controlled according to the flue gas parameters, and for the boiler flue gas, it is generally controlled at 40° C.-60° C. For sulfur recovery exhaust gas and incineration flue gas, it is generally controlled at 50° C.-70° C. For a dry method for sulfuric acid exhaust gas, it is generally controlled at 30° C.-45° C.

When the system is under the condition that the $SO_2$ concentration in the original flue gas is not greater than 30,000 mg/Nm$^3$, the purified flue gas may meet the most stringent emission standard requirements or process requirements worldwide, and the device may be tuned and designed according to specific project requirements to reduce investment and operation costs and improve the performance-price ratio.

The purified flue gas may have $SO_2$ not greater than 200 mg/Nm$^3$, for example, not greater than 100 mg/Nm$^3$, or 35 mg/Nm$^3$, or 5 mg/Nm$^3$.

The purified flue gas may have a total dust (containing aerosols) not greater than 20 mg/Nm$^3$, for example 10 mg/Nm$^3$, or 5 mg/Nm$^3$, or 2 mg/Nm$^3$.

The purified flue gas may have ammonia escape of not greater than 5 mg/Nm$^3$, for example 2 mg/NM$^3$, or 1 mg/Nm$^3$, or 0.5 mg/Nm$^3$.

When the emission index requirements are low, the investment and operation costs can be reduced by reducing levels of the absorption circulation and fine particle washing circulation and/or spraying layer number and/or circulation number, and/or increasing the ammonium sulfite content and pH values of the absorption liquid.

When the emission index requirements are strict, qualified emissions may be achieved, or production requirements of subsequent working procedures may be met, by increasing levels of the absorption circulation and fine particle washing circulation and/or spraying layer number and/or circulation number, and/or precisely controlling the ammonium sulfite content and pH values of the absorption liquid.

The mass fraction ratio of ammonium sulfate to ammonium sulfite in one or more stage of the absorption circulation liquid may be 1.5-1.99:1, for example, 9-99:1.

The mass fraction ratio of ammonium sulfate to ammonium sulfite in one or more stage of the fine particle circulation washing liquid may be 3-1999:1, for example, 9-999:1.

When it is needed to control harmful ions such as chloride ion and fluoride ion in the circulation solution, a part of the fine particle circulation washing liquid may be directly prepared as ammonium sulfate. The content of the chloride ion in the circulation solution may be less than 50,000 mg/L, for example, 10,000-31,000 mg/L, and the fluoride ion concentration may be less than 20,000 mg/L, for example, 300-3,000 mg/L.

Selected Illustrative Embodiments:

1. A method for controlling aerosol production during absorption in ammonia desulfurization, wherein sulfur dioxide in flue gas is removed with an absorption circulation liquid containing ammonium sulfite, so as to control the aerosol production during absorption in ammonia desulfurization.

2. The method of embodiment 1 wherein efficient desulfurization and dust removal are achieved by staged solution composition control and reaction condition control, and at the same time of the efficient desulfurization and dust removal, ammonia escape and aerosol production are controlled.

3. The method of embodiment 2 wherein the staged solution composition control includes concentration gradient control of ammonium sulfite, ammonium bisulfite, ammonium sulfate, or a combination thereof.

4. The method of embodiment 2 wherein the flue gas subjected to preliminary temperature lowering and purification is allowed to contact with the absorption circulation liquid and a fine particle washing circulation liquid sequentially so as to achieve synergistic control of absorption, oxidation and concentration, the absorption circulation liquid is provided with 1 stage or multiple stages as required, wherein one or more 1 stage contains ammonium sulfite and ammonium sulfate, and the fine particle washing circulation liquid is provided with 1 stage or multiple stages as required, wherein one or more stage contains ammonium sulfite and ammonium sulfate.

5. The method of embodiment 4 wherein the fine particle washing circulation liquid has a pH value being lower than a pH value of the absorption circulation liquid and an ammonium sulfite content being less than an ammonium sulfite content in the absorption circulation liquid.

6. The method of embodiment 2 wherein an absorption temperature and a washing temperature are controlled within a suitable range to reduce the energy consumption while ensuring the absorption efficiency and controlling ammonia escape and aerosols.

7. The method of embodiment 4 wherein when multiple levels are chosen for the absorption circulation liquid, one or more 1 stage of composition includes 0.15%-4.95% ammonium sulfite and 5%-38% ammonium sulfate, with a pH value of 4-6.6, the ammonium sulfite content of an upper level of the absorption circulation liquid is lower than the ammonium sulfite content of a lower level of the absorption circulation and/or the pH value of an upper level of the absorption circulation liquid is lower than the pH value of a lower level of the absorption circulation liquid.

8. The method of embodiment 4 wherein the absorption circulation liquid is of 1 to 2 stages, for example, 1 stage.

9. The method of embodiment 4 wherein one or more stage of composition of the fine particle washing circulation liquid includes 0.003%-1% ammonium sulfite and 0.3%-38% an sulfate, with a pH value of 3-5.4.

10. The method of embodiment 9 wherein the fine particle washing circulation liquid is of 2 stages, and 1 of the stages contains ammonium sulfate at a high concentration, wherein ammonium sulfite is 0.1%-1% and ammonium sulfate is 5%-38%.

11. The method of embodiment 6 wherein the absorption temperature is from 30° C. to 70° C., for example, from 35° C. to 60° C., or from 45° C. to 55° C.

12. The method of embodiment 6 wherein the washing temperature is from 28° C. to 68° C., for example, from 30° C. to 55° C., or from 40° C. to 50° C.

13. A device for controlling aerosol production in ammonia desulfurization for implementing the method of any one of embodiments 1 to 12, wherein the device includes a gas purification and removal system, an oxidation system, and an auxiliary system.

14. The device of embodiment 13 wherein the auxiliary system includes an ammonium sulfate post-processing system, an ammonia supply system, and a process water system.

15. The device of embodiment 13 wherein an absorption tower of the gas purification and removal system uses divisional control, and includes a pre-washing zone, an absorption zone, and a fine particle control zone, wherein each of the pre-washing zone, the absorption zone, and the fine particle control zone is provided with one or more layers of spraying layer, and an apparatus/component which only allows gas to pass therethrough is provided between the absorption zone and the pre-washing zone.

16. The device of embodiment 15 wherein an apparatus/component which only allows gas to pass therethrough is provided between the absorption zone and the fine particle control zone, as required.

17. The device of embodiment 15 wherein an apparatus/component which only allows gas to pass therethrough is provided within the absorption zone as required.

18. The device of embodiment 15 wherein an apparatus/component which only allows gas to pass therethrough is provided within the fine particle control zone as required.

19. The device of embodiment 15 wherein the fine particle control zone is provided with one or more layers of demisters, and each layer of the pre-washing zone and the absorption zone is provided with one or more layers of demisters as required; the demisters use baffles, ridges, fillers and wire mesh forms, or combination forms thereof.

20. The device of embodiment 15 wherein the liquid-to-gas ratio per layer is not less than 0.2 $L/Nm^3$ and the spray coverage is not less than 110% in the absorption zone; and the liquid-to-gas ratio is not less than 0.1 $L/Nm^3$ and the spray coverage is not less than 105% in each layer of the fine particle control zone.

21. The device of embodiment 13 wherein the oxidation system is arranged with layers or apparatus according to the requirements of the solution composition control, and the fine particle washing circulation liquid and the absorption circulation liquid are taken out from an oxidation vessel of the oxidation system at different positions or different apparatus.

22. The device of embodiment 21 wherein 1-5 layers of gas-liquid dispersion enhancers are provided within the oxidation vessel of the oxidation system.

23. The device of embodiment 22 wherein the gas-liquid dispersion enhancer can use one of structured fillers, random fillers, perforated plates, gas caps, and aeration heads, or any combination thereof.

24. The device of embodiment 21 wherein the oxidation vessel of the oxidation system has a liquid level greater than 3 m and not less than 20% excess oxidation air.

25. The device of any one of embodiments 13-24, wherein: the flue gas enters from the pre-washing zone and is cooled and washed by a circulation washing liquid in the pre-washing zone while the circulation washing liquid is concentrated, and then the flue gas passes through the absorption zone where the flue gas is washed and desulfurized by the absorption circulation liquid, passes through the fine particle control zone where fine particles are removed by a fine particle circulation washing liquid respectively, and then is discharged;

the circulation washing liquid in the pre-washing zone is mainly replenished from the fine particle circulation washing liquid, and the fine particle circulation washing liquid and/or process water is used to rinse fouling on a tower wall, and the absorption circulation liquid is replenished by the circulation washing liquid in the fine particle control zone and/or process water; and the absorption circulation liquid is oxidized in the oxidation system, and solutions with different compositions are drawn from the oxidation vessel of the oxidation system at different positions or different apparatus respectively for circulation.

26. The device of embodiment 25 wherein the process water is replenished from the fine particle control zone.

27. The device of embodiment 25 wherein the solution of preliminary temperature lowering and purification is lowering temperature and removing dust with the circulation washing liquid.

28. The device of embodiment 15 wherein the flue gas inlet position is at 10%-40% of the tower height, the height of the pre-washing zone is 10%-40% of the tower height, the height of the absorption zone is 10-35% of the tower height, and the height of the fine particle control zone is 15%-70% of the tower height.

29. The device of embodiment 21 wherein the ratio of the diameter of the absorption tower to the diameter of the oxidation vessel is 0.5-3, and the height of the oxidation vessel is 0.3-6 times the diameter of the absorption tower.

30. The device of embodiment 25 wherein the superficial gas velocity of the absorption tower is 1 m/s-5 m/s; and/or the operation temperature of the pre-washing zone is from 40° C. to 80° C.

31. The device of embodiment 25 wherein the concentration of $SO_2$ in original flue gas is ≤30,000 mg/Nm$^3$.

32. The device of embodiment 31 wherein the purified flue gas can meet the most stringent emission standard requirements or process requirements worldwide, and the device is optimized and designed according to specific project requirements to reduce investment and operation costs and improve the performance-price ratio.

33. The device of embodiment 31 wherein the purified flue gas has $SO_2$ of ≤200 mg/Nm$^3$, for example, ≤100 mg/Nm$^3$, ≤35 mg/Nm$^3$, or ≤5 mg/Nm$^3$.

34. The device of embodiment 32 wherein the purified flue gas has total dust (containing aerosols) of ≤20 mg/Nm$^3$, for example, ≤10 mg/Nm$^3$, or ≤5 mg/Nm$^3$, or ≤2 mg/Nm$^3$.

35. The device of embodiment 32 wherein ammonia escape into the purified flue gas is ≤5 mg/Nm$^3$, for example, ≤2 mg/Nm$^3$, or ≤2 mg/Nm$^3$, ≤0.5 mg/Nm$^3$.

36. The device of embodiment 25 wherein when harmful ions such as chloride and fluoride ions in a circulation solution need to be controlled, a part of an absorption liquid is directly made into a solid product by using a drying apparatus.

37. The device of embodiment 36 wherein the content of the chloride ion in the circulation solution is less than 50,000 mg/L, for example, 10,000-31,000 mg/L, and the fluoride ion concentration is less than 20,000 mg/L, for example, 300-3,000 mg/L.

38. The device of embodiment 21 wherein the solution composition is controlled by forced oxidation via an oxidation vessel and/or natural oxidation and/or making, the pre-washing enter into the absorption zone and/or controlling the operation temperature.

39. The device of embodiment 25 wherein the mass fraction ratio of ammonium sulfate to ammonium sulfite in one or more stage of the absorption circulation liquid is 1.5-199:1.

40. The device of embodiment 20 wherein the mass fraction ratio of ammonium sulfate to ammonium sulfite in one or more stage of the fine particle circulation washing liquid is 3-1999: 1.

Apparatus and methods described herein are illustrative. Apparatus and methods in accordance with the invention will now be described in connection with the FIGS., which form a part hereof. The FIGS. show illustrative features of apparatus and method steps in accordance with the principles of the invention. It is to be understood that other embodiments may be utilized and that structural, functional and procedural modifications may be made without departing from the scope and spirit of the present invention.

The steps of the methods may be performed in an order other than the order shown and/or described herein. Embodiments may omit steps shown and/or described in connection with the illustrative methods. Embodiments may include steps that are neither shown nor described in connection with the illustrative methods. Illustrative method steps may be combined. For example, one illustrative method may include steps shown in connection with another illustrative method.

Some apparatus may omit features shown and/or described in connection with illustrative apparatus. Embodiments may include features that are neither shown nor described in connection with the illustrative methods. Features of illustrative apparatus may be combined. For example, one illustrative embodiment may include features shown in connection with another illustrative embodiment.

The apparatus and methods of the invention will be described in connection with embodiments and features of illustrative devices. The devices will be described now with reference to the accompanying drawings in the FIGS., which form a part hereof.

As shown in FIG. 1, a method for controlling aerosol production during absorption in ammonia desulfurization is performed by removing sulfur dioxide in flue gas with an absorption circulation liquid containing ammonium sulfite, so as to control the aerosol production during absorption in ammonia desulfurization.

Efficient desulfurization and dust removal may be achieved by staged solution composition control and reaction condition control, and, concurrently, ammonia escape and aerosol production are controlled.

The staged solution composition control may include concentration gradient control of ammonium sulfite, ammonium bisulfite, ammonium sulfate, or a combination thereof.

The flue gas may enter from a pre-washing zone, and the flue gas, subjected to preliminary temperature lowering and purification in the pre-washing zone, may be allowed to contact an absorption circulation liquid 7 and a fine particle washing circulation liquid 15 sequentially, to achieve synergistic control of absorption, oxidation and concentration. The absorption circulation liquid may be provided with a single stage that includes 1% ammonium sulfite and 22% ammonium sulfate with a pH value of 6.1 and an absorption temperature of 50° C. The fine particle washing circulation liquid may be provided with three levels, wherein the lower level is a high-concentration ammonium sulfate-ammonium sulfite mixed solution including 0.17% ammonium sulfite and 22% ammonium sulfate with a pH value of 4.5 and a washing temperature of 49.3° C., the second level is a dilute ammonium sulfate-ammonium sulfite mixed solution including 0.01% ammonium sulfite and 1.5% ammonium sulfate with a pH value of 4.3 and a washing temperature of 48° C., and the third level is process water.

The apparatus may be configured to control aerosol production during absorption in ammonia desulfurization. The apparatus may include a gas purification and removal system, an oxidation system, and an auxiliary system. The auxiliary system may include an ammonium sulfate post-processing system, ammonia supply system, and a process water system.

The gas purification and removal system may include an absorption tower 1, a fine particle washing circulation tank 3, a pre-washing circulation pump, and a fine particle washing circulation pump. The absorption tower 1 may use divisional control and be divided into a pre-washing zone 4, an absorption zone 5, and a fine particle control zone 6, wherein the pre-washing zone 4, the absorption zone 5, and the fine particle control zone 6 may be provided with three, three, and five spraying layers, respectively, and a gas-liquid separator a 17 which only allows gas to pass therethrough, and allows the liquid to be conducted out from the side or the lower part, may be provided between the absorption zone 5 and the pre-washing zone 4. The fine particle control zone may be divided into three spraying layers, wherein a gas-liquid separator b 18 which only allows gas to pass therethrough, and allows the liquid to be conducted out from the side or the lower part, may be provided between the second spraying layer and the third spraying layer. The fine particle washing circulation liquid 15 in layers 1-2 may be mixed with the absorption circulation liquid 7, followed by flowing into an oxidation vessel.

The fine particle control zone may be provided with seven layers of demisters, wherein three layers are below the gas-liquid separator b including one baffle layer and two ridge layers, and four layers are below a purified flue gas outlet 8 including one baffle layer, two ridge layers and one wire mesh layer.

In each layer of the absorption zone, the liquid-to-gas ratio may be 1.5 L/Nm$^3$, and the spray coverage may be 300%. In various layers of the fine particle control zone, the liquid-to-gas ratios may be, respectively, 0.15 L/Nm$^3$, 1.1 L/Nm$^3$, 1.3 L/Nm$^3$, 0.15 L/Nm$^3$, and 1.5 L/Nm$^3$, and the spray coverages may be, respectively, 105%, 250%, 280%, 105%, and 300%.

The oxidation system may include an oxidation vessel 2, wherein the oxidation device 2 may be arranged with layers according to the requirements of the solution composition control. The fine particle washing circulation liquid 15 and the absorption circulation liquid 7 may be taken out from the oxidation vessel at different positions. Five layers of gas-liquid dispersion enhancers may be provided within the oxidation vessel. The gas-liquid dispersion enhancer uses a perforated plate.

The oxidation vessel may have a liquid level of 8 m, and 200% excess oxidation air.

The apparatus and methods may involve the following, illustrative process:
the flue gas enters from the pre-washing zone 4 and is cooled and washed by a circulation washing liquid in the pre-washing zone 4 while the circulation washing liquid is concentrated, and then the flue gas passes through the absorption zone 5 where the flue gas is washed and desulfurized by the absorption circulation liquid 7, passes through the fine particle control zone 6 where fine particles are removed by the fine particle circulation washing liquid 15 respectively, and then is discharged;

the circulation washing liquid in the pre-washing zone 4 is mainly, replenished by the fine particle circulation washing liquid 15, the fine particle circulation washing liquid 15 and/or process water 23 is used to rinse fouling on a tower wall and the like, and the absorption circulation liquid is replenished by the fine particle circulation washing liquid 15 and/or process water 23; and the absorption circulation liquid 7 is oxidized in the oxidation vessel 2, and solutions with different compositions are drawn from the oxidation vessel 2 at different positions respectively for circulation.

Sulfur dioxide in the flue gas may be removed with an absorption circulation liquid containing ammonium sulfite, ammonia may be converted into ammonium sulfite after being added into the absorption circulation liquid for ammonia desulfurization, and at the same time ammonia may be added into the pre-washing zone as needed to ensure that the free acid indicators in the ammonium sulfate product meet GB535 requirements.

The process water 23 may be replenished from the fine particle control zone 6 and the fine particle washing circulation tank 3. The flue gas inlet position may be at 12% of the tower height of the absorber tower 1. The height of the pre-washing zone 4 may be 20% of the tower height. The height of the absorption zone 5 may be 15% of the tower height. The height of the fine particle control zone 6 may be 65% of the tower height, The diameter ratio of the absorption tower 1 to the oxidation vessel 2 may be 1.5, and the height of the oxidation vessel 2 may be 1.4 times the diameter of die absorption tower 1.

The superficial gas velocity of the absorption tower 1 may be 2.75 ms/s; and the operation temperature of the pre-washing zone 4 may be 55° C.

The flue gas flow may be 186,000 Nm$^3$/h, the SO$_2$ concentration may be 3000 mg/Nm$^3$, the total dust concentration may be 19.6 mg/Nm$^3$, SO$_2$ in the purified flue gas may be 79.4 mg/Nm$^3$, the total dust (including aerosol) may be 6.5 mg/Nm$^3$, and ammonia escape may be 1.8 mg/Nm$^3$.

The solution composition may be controlled mainly through forced oxidation in the oxidation vessel 2 and controlling the operation temperature.

The mass fraction ratio of ammonium sulfate to ammonium sulfite in the absorption circulation liquid 7 may be 22:1.

The mass fraction ratio of ammonium sulfate to ammonium sulfite in the lowest fine particle circulation washing liquid 15 may be 129.4:1.

EXAMPLES

The following examples, which are presented for purposes of illustration and are not intended to limit the scope of the invention. Application of the principles of the invention is not limited to the conditions set forth in the examples, and it will be understood that the principles encompasses various changes and modifications to the examples described herein, and that such changes and modifications can be made without departing from the spirit and scope of the invention.

Example 1

1. Method for Controlling Aerosol Production During Absorption in Ammonia Desulfurization Sulfur dioxide in flue gas was removed with an absorption circulation liquid containing ammonium sulfite, so as to control the aerosol production during absorption in ammonia desulfurization.

Efficient desulfurization and dust removal were achieved by staged solution composition control and reaction condition control, and, concurrently ammonia escape and aerosol production were controlled.

The staged solution composition control included one or more of concentration gradient control of ammonium sulfite, ammonium bisulfite, ammonium sulfate.

The flue gas entered from a pre-washing zone of an absorption tower, and the flue gas, subjected to preliminary temperature lowering and purification in the pre-washing zone, was allowed to be contacted by an absorption liquid 7 and a fine particle washing circulation liquid 15 sequentially so as to achieve synergistic absorption, oxidation and concentration. The absorption circulation liquid was provided with two levels, which were taken out from an oxidation vessel at different positions and delivered using separate pumps. The first level of absorption circulation liquid included 1.5% ammonium sulfite and 24% ammonium sulfate with a pH value of 6.3 and an absorption temperature of 51° C., and the second level of absorption circulation liquid included 0.9% ammonium sulfite and 24% ammonium sulfate with a pH value of 5.5 and an absorption temperature of 50.8° C. The fine particle washing circulation liquid was provided with three levels, wherein the first level was a high-concentration ammonium sulfate-ammonium sulfite mixed solution including 0.15% ammonium sulfite and 24% ammonium sulfate with a pH value of 4.5 and washing temperature of 50.5° C., the second level was a dilute ammonium sulfate-ammonium sulfite with a pH value of 4.2 and a washing temperature of 49.8° C., and the third level was process water.

2. Device for Controlling Aerosol Production During Absorption in Ammonia Desulfurization The device mainly included a gas purification and removal system, an oxidation system, and an auxiliary system. The auxiliary system included an ammonium sulfate post-processing system, an ammonia supply system, and a process water system.

The gas purification and removal system included an absorption tower 1, a fine particle washing circulation tank 3, a pre-washing circulation pump, and a fine particle washing circulation pump. The absorption tower 1 used divisional control and was mainly divided into a pre-washing zone 4, an absorption zone 5, and a fine particle control zone 6, wherein the pre-washing zone 4, the absorption zone 5, and the fine particle control zone 6 were provided with three, three, and four spraying layers, respectively, and a gas-liquid separator a 17 which only allowed gas to pass therethrough was provided between the absorption zone 5 and the pre-washing zone 4. A gas-liquid separator 17, which only allows gas to pass therethrough, was also provided between the absorption zone 5 and the fine particle control zone 6. The fine particle control zone 6 was divided into three spraying layers, wherein a gas-liquid separator b 18, which only allows gas to pass therethrough, was provided between the first spraying layer and the second spraying layer. The first layer of spray liquid and the absorption circulation liquid entered the oxidation vessel, respectively.

The line particle control zone were provided with five layers of demisters, wherein two layers were below the gas-liquid separator b, and included one baffle layer and one ridge layer, and three layers were below a purified flue gas outlet 8, and included one ridge layer and two wire mesh layers.

The absorption zone was provided with two layers of baffle demisters.

In each layer of the absorption zone, the liquid-to-gas ratio was 1.6 L/Nm$^3$, and the spray coverage was 320%. In various layers of the fine particle control zone from top to bottom, the liquid-to-gas ratios were respectively 0.2 L/Nm$^3$, 1.2 L/Nm$^3$, 1.3 L/Nm$^3$, and 1.6 L/Nm$^3$, and the spray coverages were respectively 110%, 260%, 290%, and 320%.

The oxidation system included an oxidation vessel 2, wherein the oxidation device 2 was arranged with layers according to the requirements of the solution composition control. The fine particle washing circulation liquid 15 and the absorption circulation liquid 7 were taken out from the oxidation vessel 2 at different positions. Five layers of gas-liquid dispersion enhancers were provided within the oxidation vessel. The gas-liquid dispersion enhancer used a perforated plate and an aeration head.

The oxidation vessel had a liquid level of 9.3 m, and 250% excess oxidation air.

3. Processes and Parameters of Method for Controlling Aerosol Production During Absorption in Ammonia Desulfurization The apparatus and methods may involve the following illustrative process:

The flue gas entered from the pre-washing zone 4, and was cooled and washed by a circulation washing liquid in the pre-washing zone 4, while the circulation washing liquid was concentrated, and then the flue gas passed through the absorption zone 5, where the flue gas was washed and desulfurized by the absorption circulation liquid 7, passed through the fine particle control zone 6, where fine particles are removed by the fine particle circulation washing liquid 15, and then was discharged.

The circulation washing liquid in the pre-washing zone 4 was mainly replenished from the fine particle circulation washing liquid 15. The fine particle circulation washing liquid 15 and/or process water 23 was used to rinse fouling on tower walls and the like, and the absorption circulation liquid was replenished by the fine particle circulation washing liquid 15 and/or process water 23.

The absorption circulation liquid 7 was oxidized in the oxidation vessel 2, and solutions with different compositions were drawn from the oxidation vessel 2 at different positions respectively into the absorption zone 5 and the fine particle control zone 6 for circulation.

The process water 23 was replenished from the fine particle control zone 6 and the fine particle washing circulation tank 3.

The second level of fine particle washing circulation liquid 15 (a dilute ammonium sulfate-ammonium sulfite mixed solution) was mixed with the first level of fine particle washing circulation liquid 15 (a high-concentration ammonium sulfate-ammonium sulfite mixed solution) via a pipeline, and then sprayed at a spraying layer in the fine particle control zone 6 of the absorption tower 1.

The absorbent was 20% ammonia, which was replenished into the pre-washing zone 4 and the oxidation vessel 2. Sulfur dioxide in the flue gas was removed with an absorption circulation liquid containing ammonium sulfite. Ammonia was converted into ammonium sulfite after being added into the oxidation vessel for ammonia desulfurization, and concurrently ammonia was added into the pre-washing zone to ensure that the free acid indicators in the ammonium sulfate product meet the GB535 requirements.

Oxidation air was added into the oxidation vessel 2, and the outlet gas from the oxidation vessel 2 was introduced into the absorption zone 4 of the absorption tower 1 for natural oxidation of the absorption liquid.

The flue gas inlet position was at 11% of the tower height of the absorber tower 1, the height of the pre-washing zone 4 was 21% of the tower height, the height of the absorption zone 5 was 20% of the tower height, and the height of the fine particle control zone 6 was 59% of the tower height.

The diameter ratio of the absorption tower 1 to the oxidation vessel 2 was 1.1, and the height of the oxidation vessel 2 was 1.2 times the diameter of the absorption tower 1.

The superficial gas velocity of the absorption tower 1 was 2.68 m/s; and the operation temperature of the pre-washing zone 4 was 56° C.

The flue gas flow was designed to be 510,000 Nm$^3$/h, the $SO_2$ concentration was designed to be 5,000 mg/Nm$^3$, and the total dust concentration was designed to be no greater than 25 mg/Nm$^3$.

During the test, $SO_2$ in the purified flue gas was 21 mg/Nm$^3$, the total dust (including aerosol) was 1.3 mg/Nm$^3$, and ammonia escape was 0.8 mg/Nm$^3$.

The solution compositions in different zones were controlled mainly through forced oxidation in the oxidation vessel 2, natural oxidation in the absorption zone 4, controlling the operation temperature and other means.

TABLE 1

| | Device design parameters | | |
|---|---|---|---|
| Number | Process indicator | Unit | Numerical value |
| 1 | Flue gas flow | Nm$^3$/h | 510,000 |
| 2 | Flue gas inlet temperature | ° C. | 140-160 |
| 3 | $SO_2$ concentration in flue gas | mg/Nm$^3$ | 5,000 |
| 4 | Dust concentration at flue gas inlet | mg/Nm$^3$ | ≤25 |
| 5 | $SO_2$ concentration in outlet flue gas | mg/Nm$^3$ | ≤35 |
| 6 | Dust concentration in outlet flue gas | mg/Nm$^3$ | ≤5 |
| 7 | Ammonia escape concentration in outlet flue gas | mg/Nm$^3$ | ≤1 |
| 8 | Recovery rate of ammonia | % | ≥99.3 |

The flue gas in different working conditions was subjected to ammonia desulfurization and dust removal using the device and method of Example 1. Table 2 shows the test methods and test instruments. Table 3 shows the operation parameter and test results.

TABLE 2

| | Test methods for each indicator and list of major instruments | | | |
|---|---|---|---|---|
| Number | Monitoring item | Standard name and number of analytical method | Name and type of instrument | Instrument number |
| 1 | Dust and fume | Determination of particulates and sampling methods of gaseous pollutants from exhausted gas of stationary source GB/T16157-1996 | Laoying 3012H type dust and fume sampler Electronic balances BS224S, AB204-S | 8042448, 08244496 18360886, and 1119051201 |
| 2 | $SO_2$ | Determination of sulfur dioxide from exhausted gas of stationary source Fixed-potential electrolysis method HJ/T 57-2000 | Testo 350 flue gas analyzer | 10$^\#$, and 1$^\#$ |
| 3 | $NO_x$ | Determination of nitrogen oxides from exhausted gas of stationary source Fixed-potential electrolysis method HJ/T 693-2014 | Testo 350 flue gas analyzer | 10$^\#$, and 1$^\#$ |
| 4 | Ammonia | Ambient air and exhausted gas - Determination of ammonia Nessler's reagent spectrophotometry HJ 533-2009 | Laoying 3072H type 722 spectrophotometer | 02085809, and 2c5BP363 |
| 5 | Oxygen content of flue gas | Electrochemical method - Specifications and test procedures for continuous emission monitoring systems of flue gas emitted from stationary sources (Appendix B) (HJ/T 76-2007) | Testo 350 flue gas analyzer | 10$^\#$, and 1$^\#$ |
| 6 | Flue gas temperature | Platinum resistance method - Determination of particulates and sampling methods of gaseous pollutants from exhausted gas of stationary source (GB/T 16157-1996) | TES-1310 | / |
| 7 | Flue gas humidity | Specifications and test procedures for continuous emission monitoring systems of flue gas emitted from stationary sources (Appendix B) (HJ/T 76-2007) | Laoying 3012H type dust and fume sampler | 8042448, and 08244496 |
| 8 | Ammonia sulfate | Ammonia sulfate (GB 535-1995) | Analytical balance, pH meter and other conventional laboratory instruments | |

TABLE 3

Device operating parameters and test results

| Number | Item | | Unit | Test result | Comments |
|---|---|---|---|---|---|
| 1 | Flue gas volume in absorption tower | Standard state, wet basis, and actual $O_2$ | $\times 10^4$ m$^3$/h | 45.67 | — |
| | | Standard state, dry basis, and 6% $O_2$ | $\times 10^4$ m$^3$/h | 41.34 | — |
| 2 | System resistance | | Pa | 1021 | — |
| 3 | Original flue gas parameters | SO$_2$ concentration (standard state, dry basis, and 6% $O_2$) | mg/Nm$^3$ | 4230 | Mean value during test |
| | | $O_2$ (V/V) | % | — | — |
| | | Temperature | ° C. | 127.3 | Mean value during test |
| | | Moisture content (V/V) | % | 9.05 | — |
| | | Dust and fume concentration (standard state, dry basis, and 6% $O_2$) | mg/Nm$^3$ | 23.6 | — |
| 4 | Purified flue gas parameters | SO$_2$ concentration (standard state, dry basis, and 6% $O_2$ | mg/Nm$^3$ | 21 | Mean value during test |
| | | $O_2$ (V/V) | % | — | — |
| | | Temperature | ° C. | 49.8 | Mean value during test |
| | | Moisture content (V/V) | % | 14.23 | — |
| | | Dust and fume concentration (standard state, dry basis, and 6% $O_2$) | mg/Nm$^3$ | 1.3 | Including solid particles and soluble solid particles |
| | | Escape free ammonia (standard state, dry basis, and 6% $O_2$) | mg/Nm$^3$ | 0.8 | — |
| 5 | Desulfurization efficiency of absorption tower | | % | 99.5 | — |
| 6 | Dust removal efficiency of absorption tower | | % | 94.5 | — |
| 7 | Ammonia consumption on the basis of 20% ammonia) | | t/h | 4.659 | — |
| 8 | Ammonia utilization | | % | 99.45 | — |
| 9 | Ammonium sulfate by-product | Nitrogen content | % | 21.1 | — |
| | | Moisture | % | 0.25 | — |
| | | Free acid content | % | 0.03 | — |

Example 2

1. Method for Controlling Aerosol Production During Absorption in Ammonia Desulfurization Sulfur dioxide in flue gas was removed with an absorption circulation liquid containing ammonium sulfite, so as to control the aerosol production during absorption in ammonia desulfurization.

Efficient desulfurization and dust removal were achieved by staged solution composition control and reaction condition control, and concurrently ammonia escape and aerosol production were controlled.

The staged solution composition control included concentration gradient control of one or more of ammonium sulfite, ammonium bisulfite, ammonium sulfate.

The flue gas enters from a pre-washing zone. The flue gas, subjected to preliminary temperature lowering and purification in the pre-washing zone, was allowed to contact with an absorption circulation liquid 7 and a fine particle washing circulation liquid 15 sequentially, so as to achieve synergistic control of absorption, oxidation and concentration. The absorption circulation liquid was provided with two levels, which were taken out from art absorption circulation tank 16 at different positions and delivered using separate pumps. The first level of absorption circulation liquid included 2% ammonium sulfite and 27% ammonium sulfate with a pH value of 6.4 and an absorption temperature of 49° C., and the second level of absorption circulation liquid included 1.1% ammonium sulfite and 27.9% ammonium sulfate with a pH value of 5.7 and an absorption temperature of 48.7° C. The fine particle washing circulation liquid was provided with four levels, wherein the first level was a high-concentration ammonium sulfate-ammonium sulfite mixed solution including 0.2% ammonium sulfite and 28.8% ammonium sulfate with a pH value of 4.9 and a washing temperature of 48.5° C., the second level was a dilute ammonium sulfate-ammonium sulfite mixed solution including 0.03% ammonium sulfite and 3.7% ammonium sulfate with a pH value of 4.3 and a washing temperature of 48.2° C., the third level was a lower-concentration dilute ammonium sulfate-ammonium sulfite mixed solution including 0.005% ammonium sulfite and 0.5% ammonium sulfate with a pH value of 4.25 and a washing temperature of 48.1° C., and the fourth level was process water.

2. Device for Controlling Aerosol Production During Absorption in Ammonia Dead Desulfurization The device mainly included a gas purification and removal system, an oxidation system, and an auxiliary system. The auxiliary system included an ammonium sulfate post-processing system, an ammonia supply system, and a process water system.

The gas purification and removal system included an absorption tower 1, an absorption circulation tank 16, a fine particle washing circulation tank a 3, a fine particle washing circulation tank b 3, a pre-washing circulation pump, an absorption circulation pump, and a fine particle washing circulation pump. The absorption tower 1 used divisional control and was mainly divided into a pre-washing zone 4, an absorption zone 5, and a fine particle control zone 6, wherein the pre-washing zone 4, the absorption zone 5, and the fine particle control zone 6 were provided with three, four, and five spraying layers, respectively, and a gas-liquid separator a 17 which only allowed gas to pass therethrough was provided between the absorption zone 5 and the pre-washing zone 4. A gas-liquid separator a 17 which only allowed gas to pass therethrough was also provided between the absorption zone 5 and the fine particle control zone 6. A gas-liquid separator b 18 which only allowed gas to pass therethrough was provided between the first absorption (two spraying layer) and the second absorption (two spraying layer) in the absorption zone 5, between the first spraying layer and the second spraying layer in the fine particle control zone 6, and between the third spraying layer and the fourth spraying layer in the fine particle control zone. The absorption circulation liquid 7 entered the absorption circulation tank. The first layer of fine particle circulation washing liquid 15 entered the oxidation vessel 2. The second layer and the third layer of fine particle circulation washing liquid 15 entered the fine particle washing circulation tank a 3. The fourth layer and the fifth layer of fine particle circulation washing liquid 15 entered the fine particle washing circulation tank b 3.

The fine particle control zone was provided with seven layers of demisters, wherein two layers were below the gas-liquid separator b 18 between the first spraying layer and the second spraying layer including two ridge layers, two layers were below the gas-liquid separator b 18 between the third spraying layer and the fourth spraying layer included one ridge layer and one wire mesh layer, and three layers are below a purified flue gas outlet 8 included one ridgelayer and two wire mesh layers.

The absorption zone was provided with one layer of baffle demisters and one layer of ridge demisters.

In each layer of the absorption zone, the liquid-to-gas ratio was 2.1 L/Nm$^3$, and the spray coverage was 400%. In various layers of the fine particle control zone from top to bottom, the liquid-to-gas ratios were respectively 0.16 L/Nm$^3$, 2.1 L/Nm$^3$, 1.4 L/Nm$^3$, 1.4 L/Nm$^3$, and 2.1 L/Nm$^3$, and the spray coverages were respectively 110%, 400%, 300%, 300%, and 400%.

The absorption circulation tank 16 was set with layers according to the requirements of the solution composition control. The first level of absorption circulation liquid 7 and the second level of absorption circulation liquid 7 were taken out from an absorption circulation tank 2 at different positions. Two layers of gas-liquid dispersion enhancers were provided within the absorption circulation tank 16, which were structured fillers.

The oxidation system included an oxidation vessel 2. Five layers of gas-liquid dispersion enhancers were provided within the oxidation vessel. The gas-liquid dispersion, enhancer used a perforated plate and an aeration head.

The liquid level in the oxidation vessel 2 was 10 m.

The oxidation air added into the absorption circulation tank 16 and the oxidation vessel 2 was in excess of 350%.

The ammonium sulfate post-processing system was provided with a drying tower, through which part of the fine particle circulation washing liquid was converted directly into ammonium sulfate, so as to control the content of chloride ion and fluoride ion in various circulation solutions.

3. Processes and Parameters of Method for Controlling Aerosol Production During Absorption in Ammonia Desulfurization Specific processes of the above method or device were as follows:

The flue gas entered from the pre-washing zone 4 and was cooled and washed by a circulation washing liquid in the pre-washing zone 4 while the circulation washing liquid was concentrated, and then the flue gas was passed through the absorption zone 5, where the flue gas was washed and desulfurized by the absorption circulation liquid 7, passed through the fine particle control zone 6, where fine particles are removed by the fine particle circulation washing liquid 15, respectively, and then was discharged.

The circulation washing liquid in the pre-washing zone 4 was mainly replenished from the fine particle circulation washing liquid 15, and the fine particle circulation washing liquid 15 and/or process water 23 was used to rinse fouling on a tower wall, and the absorption circulation liquid was replenished by the fine particle circulation washing liquid 15 and/or process water 23.

The absorption circulation liquid 7 was oxidized in the absorption circulation tank 16, and solutions with different compositions were drawn from the absorption circulation tank 16 at different positions respectively into the first absorption and the second absorption.

The process water 23 was replenished from the fine particle control zone 6 and the fine particle washing circulation tank 3.

The second level and the third level of fine particle washing circulation liquid 15 (a dilute ammonium sulfate-ammonium sulfite mixed solution) were replenished into the oxidation vessel 2.

The fourth level of fine particle washing circulation liquid 15 was replenished into the fine particle washing circulation tank 3.

The first level of fine particle washing circulation liquid 15 was replenished into the absorption circulation tank 16.

The absorbent was liquid ammonia and was mainly replenished into the absorption circulation tank 16. Sulfur dioxide in the flue gas was removed with an absorption circulation liquid containing ammonium sulfite, and ammonia was converted into ammonium sulfite after being added into the absorption circulation tank 16 for ammonia desulfurization.

Ammonia was added into the pre-washing zone 4 to adjust the pH value to ensure that the free acid indicators in the ammonium sulfate product met the GB535 requirements. Ammonia was added into the oxidation vessel 2 to adjust the pH value.

Oxidation air was added into the oxidation vessel 2 and the absorption circulation tank 16, and the outlet gases from the oxidation vessel 2 and the absorption circulation tank 16 were introduced into the absorption zone 4 of the absorption tower 1 for natural oxidation of the absorption liquid.

The flue gas inlet position was at 7% of the tower height of the absorber tower 1, the height of the pre-washing zone 4 was 17% of the tower height, the height of the absorption zone 5 was 25% of the tower height, and the height of the fine particle control zone 6 was 58% of the tower height.

The diameter ratio of the absorption tower 1 to the oxidation vessel 2 was 0.85, and the height of the oxidation vessel 2 was 1.25 times the diameter of the absorption tower 1.

The superficial gas velocity of the absorption tower 1 was 2.64 m/s; and the operation temperature of the pre-washing zone 4 was 51° C.

The flue gas flow was designed to be 350,000 Nm$^3$/h, the $SO_2$ concentration was designed to be 15,000 mg/Nm$^3$, the hydrogen chloride content was designed to be 100 mg/Nm$^3$, and the total dust concentration was designed to be no greater than 30 mg/Nm$^3$.

The flue gas had a high content of sulfur dioxide. After calculation and analysis with water balance, 10%-20% of the high-concentration fine particle circulation washing liquid was needed to be fed into an evaporation crystallization system for separate treatment, and the rest of the high-concentration fine particle circulation washing liquid was concentrated and crystallized in the pre-washing zone of the absorption tower. Taking into account that the tower was designed for flue gas hydrogen chloride content to be up to 100 mg/Nm$^3$, a drying apparatus was selected (instead of the evaporation, crystallization system) wherein 10%-20% of the high-concentration fine particle circulation washing liquid was dried directly in the drying apparatus to control the chloride ion concentration to be 10,000-30,000 mg/L and the fluoride ion concentration control to be 500-2800 mg/L in the circulation liquid.

During the test, $SO_2$ in the purified flue gas was 3.4 mg/Nm$^3$, the total dust (including aerosol) was 0.9 mg/Nm$^3$, and ammonia escape was 0.25 mg/Nm$^3$.

The solution compositions in different zones were controlled mainly through forced oxidation in the oxidation vessel 2, forced oxidation in the absorption circulation tank 16, natural oxidation in the absorption zone 4, controlling the operation temperature and other means.

TABLE 4

Device design parameters

| Number | Process indicator | Unit | Numerical value |
|---|---|---|---|
| 1 | Flue gas flow | $Nm^3/h$ | 350000 |
| 2 | Flue gas inlet temperature | ° C. | 130-142 |
| 3 | $SO_2$ concentration in flue gas | $mg/Nm^3$ | 15000 |
| 4 | Dust concentration at flue gas inlet | $mg/Nm^3$ | ≤30 |
| 5 | $SO_2$ concentration in outlet flue gas | $mg/Nm^3$ | ≤5 |
| 6 | Dust concentration in outlet flue gas | $mg/Nm^3$ | ≤2 |
| 7 | Ammonia escape concentration in outlet flue gas | $mg/Nm^3$ | ≤0.5 |
| 8 | Recovery rate of ammonia | % | ≥99 |

4. Implementation Effect

The flue gas in different working conditions was subjected to ammonia desulfurization and dust removal using the device and method of Example 2. Table 5 shows the test methods and test instruments. Table 6 shows the operation parameters and test results.

TABLE 5

Test methods for each indicator and list of major instruments

| Number | Monitoring item | Standard name and number of analytical method | Name and type of instrument | Instrument number |
|---|---|---|---|---|
| 1 | Dust and fume | Determination of particulates and sampling methods of gaseous pollutants from exhausted gas of stationary source GB/T16157-1996 | Laoying 3012H type dust and fume sampler Electronic balances BS224S, AB204-S | 8042448, 08244496 18360886, 1119051201 |
| 2 | $SO_2$ | Determination of sulfur dioxide from exhausted gas of stationary source Fixed-potential electrolysis method HJ/T 57-2000 | Testo 350 flue gas analyzer | 10#, and 1# |
| 3 | $NO_X$ | Determination of nitrogen oxides from exhausted gas of stationary source Fixed-potential electrolysis method HJ/T 693-2014 | Testo 350 flue gas analyzer | 10#, and 1# |
| 4 | Ammonia | Ambient air and exhausted gas - Determination of ammonia Nessler's reagent spectrophotometry HJ 533-2009 | Laoying 3072H type 722 spectrophotometer | 02085809, and 2c5BP363 |
| 5 | Oxygen content of flue gas | Electrochemical method - Specifications and test procedures for continuous emission monitoring systems of flue gas emitted from stationary sources (Appendix B) (HJ/T 76-2007) | Testo 350 flue gas analyzer | 10#, and 1# |
| 6 | Flue gas temperature | Platinum resistance method - Determination of particulates and sampling methods of gaseous pollutants from exhausted gas of stationary source (GB/T 16157-1996) | TES-1310 | / |
| 7 | Flue gas humidity | Specifications and test procedures for continuous emission monitoring systems of flue gas emitted from stationary sources (Appendix B) (HJ/T 76-2007) | Laoying 3012H type dust and fume sampler | 8042448, 08244496 |
| 8 | Ammonia sulfate | Ammonia sulfate, (GB 535-1995) | Analytical balance, pH meter and other conventional laboratory instruments | |

TABLE 6

Device operating parameters and test results

| Number | Item | | Unit | Test result | Comments |
|---|---|---|---|---|---|
| 1 | Flue gas volume in absorption tower | Standard state, wet basis, and actual $O_2$ | $\times 10^4\ m^3/h$ | 31.44 | — |
| | | Standard state, dry basis, and 6% $O_2$ | $\times 10^4\ m^3/h$ | 28.95 | — |
| 2 | System resistance | | Pa | 1850 | — |
| 3 | Original flue gas parameters | $SO_2$ concentration (standard state, dry basis, and 6% $O_2$) | $mg/Nm^3$ | 12285 | Mean value during test |
| | | $O_2$ (V/V) | % | — | — |
| | | Temperature | ° C. | 128 | Mean value during test |
| | | Moisture content (V/V) | % | 7.92 | — |
| | | Dust and fume concentration (standard state, | $mg/Nm^3$ | 27.5 | — |

TABLE 6-continued

Device operating parameters and test results

| Number | Item | | Unit | Test result | Comments |
|---|---|---|---|---|---|
| 4 | Purified flue gas parameters | $SO_2$ concentration (standard state, dry basis, and 6% $O_2$) | mg/Nm³ | 3.4 | Mean value during test |
| | | $O_2$ (V/V) | % | — | |
| | | Temperature | °C. | 48.2 | Mean value during test |
| | | Moisture content (V/V) | % | 13.75 | — |
| | | Dust and fume concentration (standard state, dry basis, and 6% $O_2$) | mg/Nm³ | 0.9 | Including solid particles and soluble solid particles |
| | | Escape free ammonia (standard state, dry basis, and 6% $O_2$) | mg/Nm³ | 0.25 | — |
| 5 | Desulfurization efficiency of absorption tower | | % | 99.97 | |
| 6 | Dust removal efficiency of absorption tower | | % | 96.7 | |
| 7 | Ammonia consumption (on the basis of 99.6% liquid ammonia) | | t/h | 1.907 | |
| 8 | Ammonia utilization | | % | 99.75 | — |
| 9 | Ammonium sulfate by-product | Nitrogen content | % | 21.2 | |
| | | Moisture | % | 0.3 | — |
| | | Free acid content | % | 0.05 | — |

Thus, apparatus and methods for controlling aerosol production during absorption of sulfur dioxide from a flue gas have been provided. Persons skilled in the art will appreciate the present invention can be practiced by other than the described examples, which are presented for purposes of illustration rather than of limitation. The present invention is limited only by the claims that follow.

What is claimed is:

1. Apparatus for controlling aerosol production in ammonia desulfurization, the apparatus comprising:
   a gas purification and removal system that is configured to apply an ammonium salt gradient to flue gas;
   an oxidation system configured, to form the ammonium salt gradient, to provide:
      to a fine particle washing circulation liquid an ammonium solution of a first composition; and p2 to an absorption circulation liquid an ammonium solution of a second composition;
   an auxiliary system;
   a tower that:
      houses the gas purification and removal system; and
      includes:
         a pre-washing zone;
         an absorption zone; and
         a fine particle control zone;
      a plurality of spraying layers, each of the pre-washing zone, the absorption zone, and the fine particle control zone including a spraying layer of the plurality of spraying layers; and
      a plurality of demister layers, wherein a demister layer of the plurality of demister layers is disposed in the fine particle control zone.

2. The apparatus of claim 1 further comprising a component disposed between the absorption zone and the pre-washing zone that allows only gas to pass; and
   wherein the tower is configured to provide divisional control of solution compositions to the spraying layers.

3. The apparatus of claim 2 wherein
   a demister layer of the plurality is disposed in each spraying layer of the pre-washing zone and the absorption zone.

4. The apparatus of claim 3 wherein a demister of the plurality of demister layers includes a baffle.

5. The apparatus of claim 3 wherein a demister of the plurality of demister layers includes a ridge.

6. The apparatus of claim 3 wherein a demister of the plurality of demister layers includes filler.

7. The apparatus of claim 3 wherein a demister of the plurality of demister layers includes a wire mesh.

8. The apparatus of claim 3 wherein a demister of the plurality of demister layers includes a structure selected from the group consisting of:
   a baffle;
   a ridge;
   filler;
   wire mesh; and
   a combination of one or more of a baffle; a ridge; filler; and wire mesh.

9. The apparatus of claim 2 wherein:
   in each spraying layer of the absorption zone:
      a liquid-to-gas ratio is not less than 0.2 L/Nm₃; and
      spray coverage is not less than 110%; and,
   in each spraying layer of the fine particle control zone:
      a liquid-to-gas ratio is not less than 0.1 L/Nm₃; and
      spray coverage is not less than 105%.

10. The apparatus of claim 2 wherein the tower is configured to:
   cool and wash the flue gas using circulation washing liquid in the pre-washing zone, and simultaneously increase a concentration of the circulation washing liquid;
   pass the flue gas through the absorption zone, in which the flue gas is washed and desulfurized by absorption circulation liquid;
   pass the flue gas through the fine particle control zone, in which fine particles are removed by a fine particle circulation washing liquid;
   discharge the flue gas;
   replenish the circulation washing liquid in the pre-washing zone from the fine particle circulation washing liquid;
   rinse fouling on a tower wall;
   replenish the absorption circulation liquid;
   oxidize the absorption circulation liquid in the oxidation system, and
   draw circulation liquids with different compositions from different sections of the oxidation system for distribution to the different zones.

11. The apparatus of claim 10 wherein the fine particle circulation washing liquid is a majority constituent of circulation washing liquid replenishment fluids.

12. The apparatus of claim 10 wherein the tower is configured to rinse fouling by spraying fine particle circulation washing liquid.

13. The apparatus of claim 10 wherein the tower is configured to rinse fouling by spraying process water.

14. The apparatus of claim 10 wherein the absorption circulation liquid is replenished by liquid from a fine particle control zone.

15. The apparatus of claim 10 wherein the absorption circulation liquid is replenished by process water.

16. The apparatus of claim 15 wherein the process water is replenished from liquid from the fine particle control zone.

17. The apparatus of claim 10 further comprising a drying device that is configured to:
receive absorption liquid; and
produce a solid product that includes an ion from a circulation liquid.

18. The apparatus of claim 17 wherein the ion is chloride.

19. The apparatus of claim 18 wherein the drying device is configured to reduce the circulation liquid chloride ion concentration to 10,000-31,000 mg/L.

20. The apparatus of claim 17 wherein the ion is fluoride.

21. The apparatus of claim 20 wherein the drying device is configured to reduce the circulation liquid fluoride ion concentration to 300-3000 mg/L.

22. The apparatus of claim 10 wherein the tower is configured to spray, in a spraying layer in the absorption zone, absorption circulation liquid having a mass fraction ratio of ammonium sulfate to ammonium sulfite that is in the range 1.5-199 to 1.

23. The apparatus of claim 10 wherein the tower is configured to spray, in a spraying layer in the fine particle absorption zone, fine particle circulation washing liquid having a mass fraction ratio of ammonium sulfate to ammonium sulfite that is in the range 3-1999 to 1.

24. Apparatus for controlling aerosol production in ammonia desulfurization, the apparatus comprising:
a gas purification and removal system that is configured to apply an ammonium salt gradient to flue gas;
an oxidation system; and
an auxiliary system;
wherein the oxidation system:
includes a plurality of sections, each section corresponding to an ammonium solution of a different composition.

25. The apparatus of claim 24 wherein each section is defined by a layer of the oxidation system.

26. The apparatus of claim 24 wherein each section is defined by a component of the oxidation system.

27. The apparatus of claim 24 wherein each section occupies a different position in the oxidation system.

28. The apparatus of claim 24 wherein the oxidation system includes 1-5 layers of gas-liquid dispersion enhancers.

29. The apparatus of claim 24 wherein the oxidation system includes a liquid stage having a height greater than 3 m.

30. The apparatus of claim 29 wherein the oxidation system is configured to provide not less than 20% excess oxidation air.

* * * * *